(12) United States Patent
West

(10) Patent No.: US 12,415,578 B2
(45) Date of Patent: Sep. 16, 2025

(54) TRUCK TOWING SYSTEM

(71) Applicant: Truckmovers.com, Inc., Independence, MO (US)

(72) Inventor: Dean West, Richland, MO (US)

(73) Assignee: Truckmovers.com, Inc., Independence, MO (US)

( * ) Notice: Subject to any disclaimer, the term of this patent is extended or adjusted under 35 U.S.C. 154(b) by 854 days.

(21) Appl. No.: 17/590,067

(22) Filed: Feb. 1, 2022

(65) Prior Publication Data
US 2022/0242497 A1 Aug. 4, 2022

Related U.S. Application Data

(60) Provisional application No. 63/145,591, filed on Feb. 4, 2021.

(51) Int. Cl.
*B62D 53/08* (2006.01)

(52) U.S. Cl.
CPC ..... *B62D 53/0842* (2013.01); *B62D 53/0807* (2013.01)

(58) Field of Classification Search
CPC . B62D 53/0842; B62D 53/0807; B60P 3/125; B60D 1/015; B60D 1/145
See application file for complete search history.

(56) References Cited

U.S. PATENT DOCUMENTS

| | | | | |
|---|---|---|---|---|
| 5,163,803 | A * | 11/1992 | Marola | B62D 53/0828 280/402 |
| 5,249,911 | A * | 10/1993 | Marola | B62D 53/0828 280/402 |
| 8,371,599 | B2 | 2/2013 | Duvall et al. | |
| 8,622,413 | B2 * | 1/2014 | Schuettenberg | B60D 1/145 280/402 |
| 8,876,139 | B2 | 11/2014 | Duvall et al. | |
| 9,114,677 | B2 * | 8/2015 | Schuettenberg | B60D 1/488 |
| 9,636,957 | B2 | 5/2017 | Duvall et al. | |
| 9,637,039 | B1 * | 5/2017 | Vildosola | B60P 3/075 |
| 11,247,517 | B2 * | 2/2022 | Schuettenberg | B60D 1/24 |
| 2012/0146312 | A1 * | 6/2012 | Duvall | B60P 3/125 280/402 |
| 2012/0313347 | A1 * | 12/2012 | Schuettenberg | B60D 1/00 280/402 |

OTHER PUBLICATIONS

Canadian Patent Application No. 3147831 Office Action issued Nov. 10, 2023, 5 pages.

* cited by examiner

*Primary Examiner* — Minnah L Seoh
*Assistant Examiner* — Marlon A Arce
(74) *Attorney, Agent, or Firm* — Polsinelli PC

(57) ABSTRACT

A truck towing system is described. The truck towing system provides for a first truck to tow a second truck in a back to front relationship, i.e., the front portion of the second truck (the towed truck) is connected or attached to a rear portion of the first truck (the towing truck). The truck towing system includes an upper member to connect with a first truck. A middle member joins the upper member and a lower member in a fixed engagement. The lower member supports a front portion of a second truck. A beam member is engaged to the lower member. The beam member connects to a rear portion of the second truck.

23 Claims, 14 Drawing Sheets

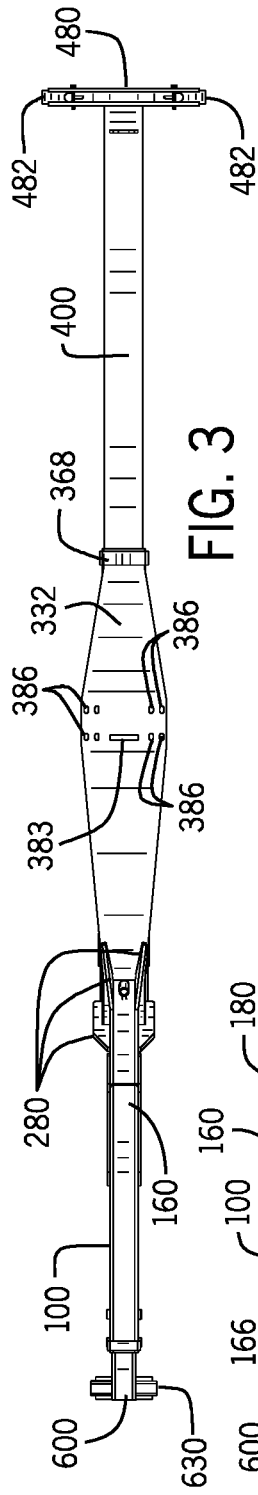
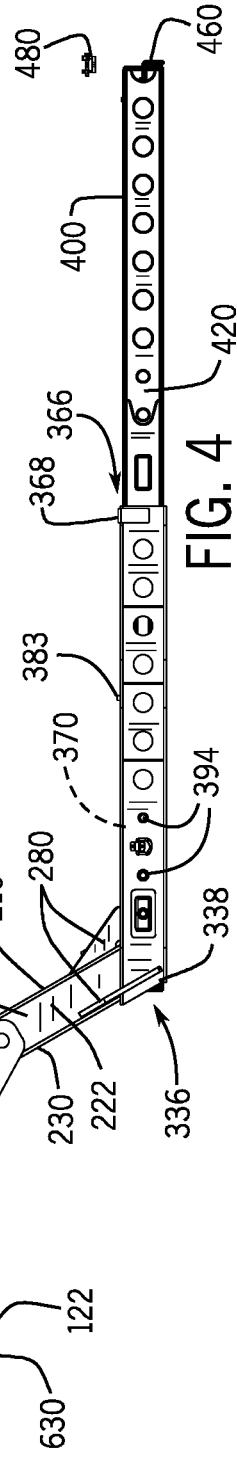
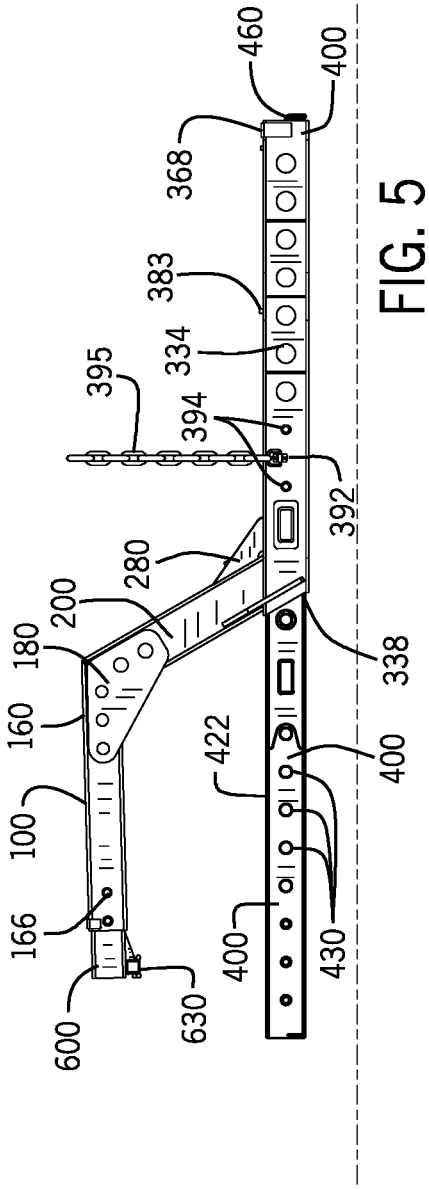
FIG. 3
FIG. 4
FIG. 5

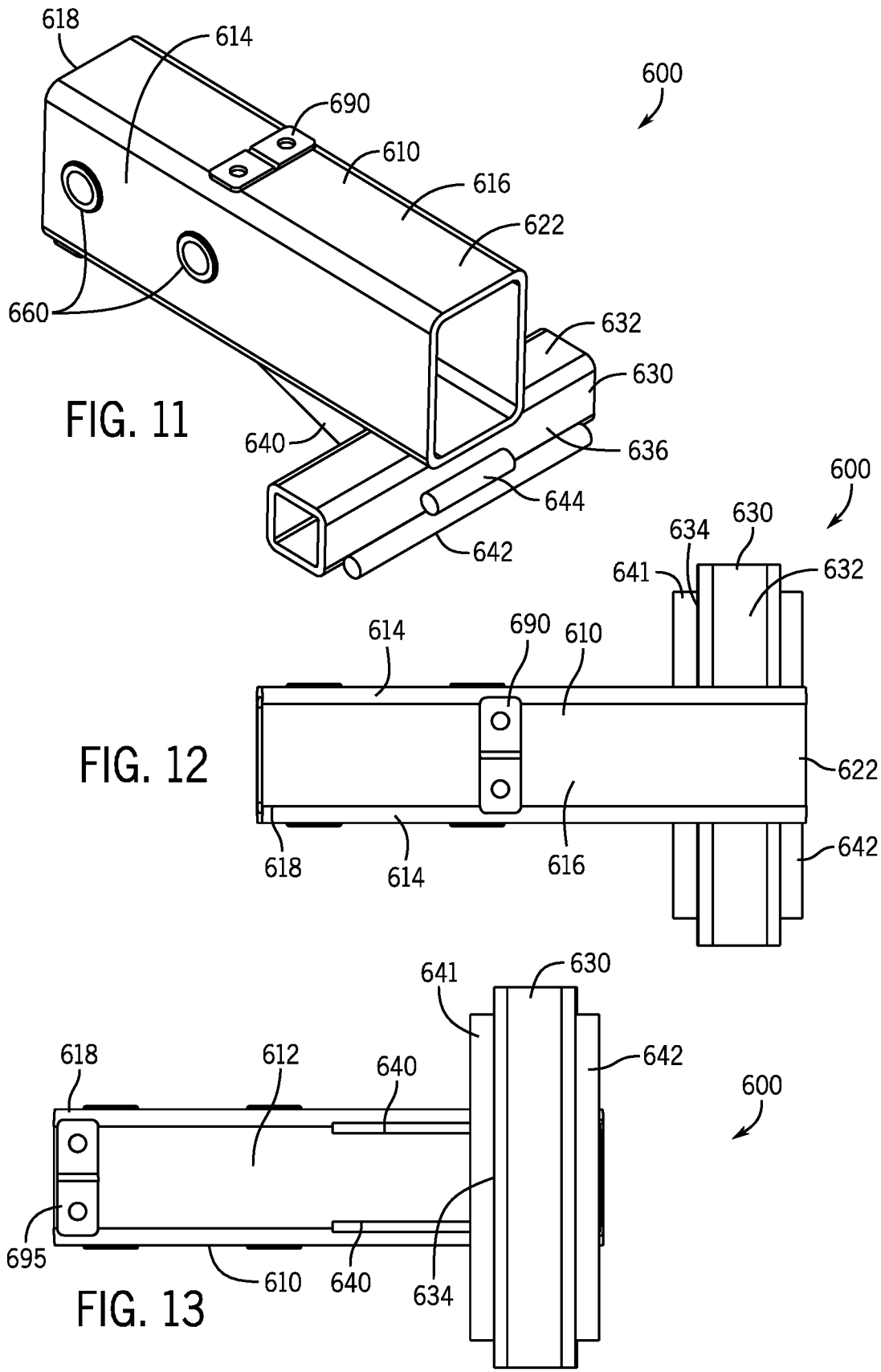

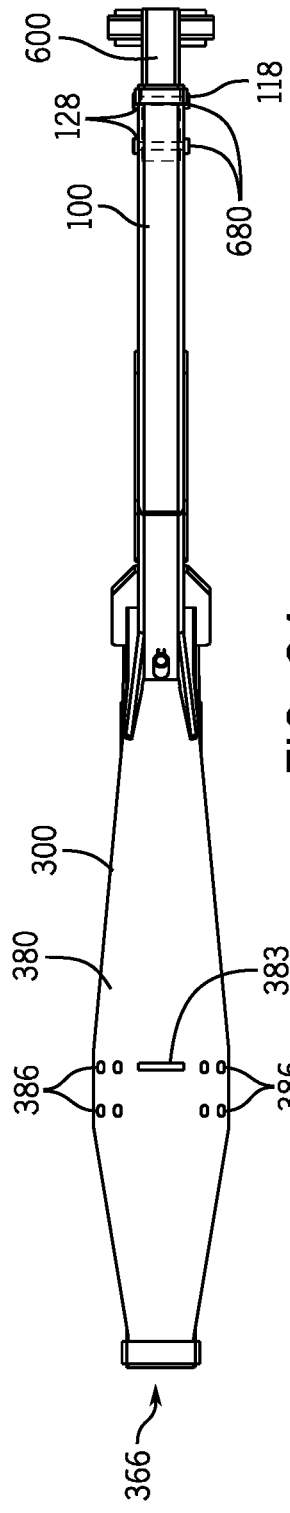
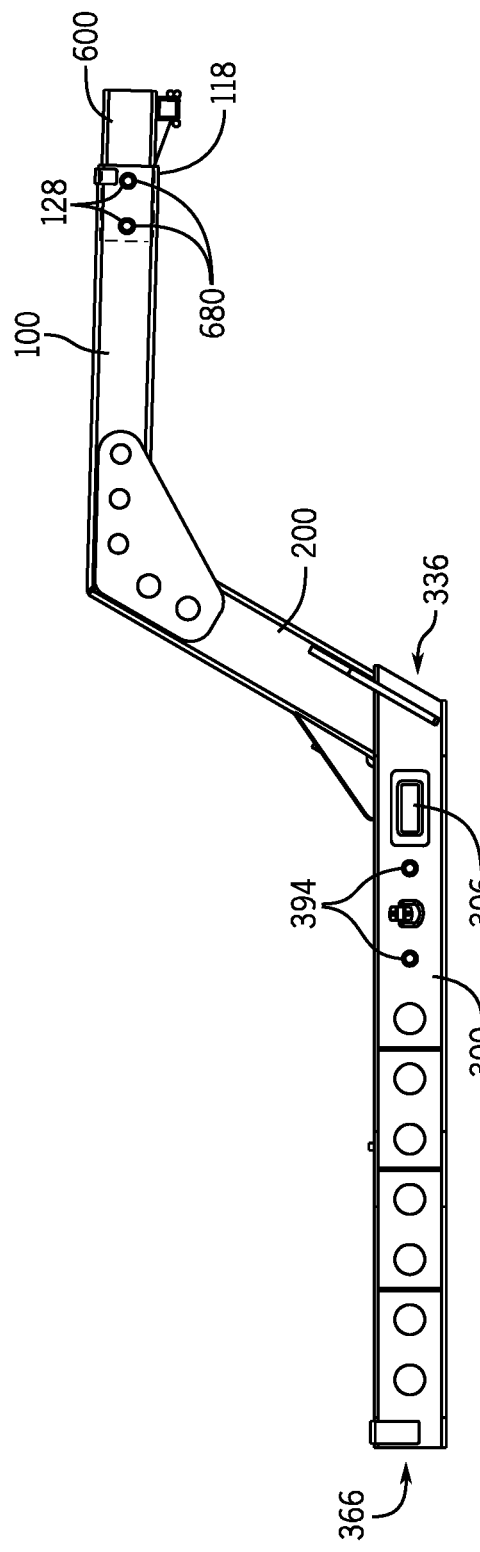

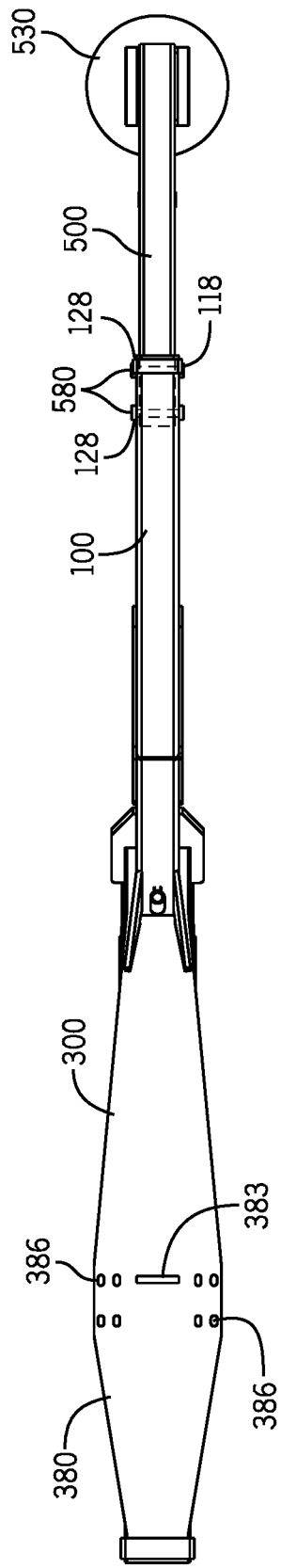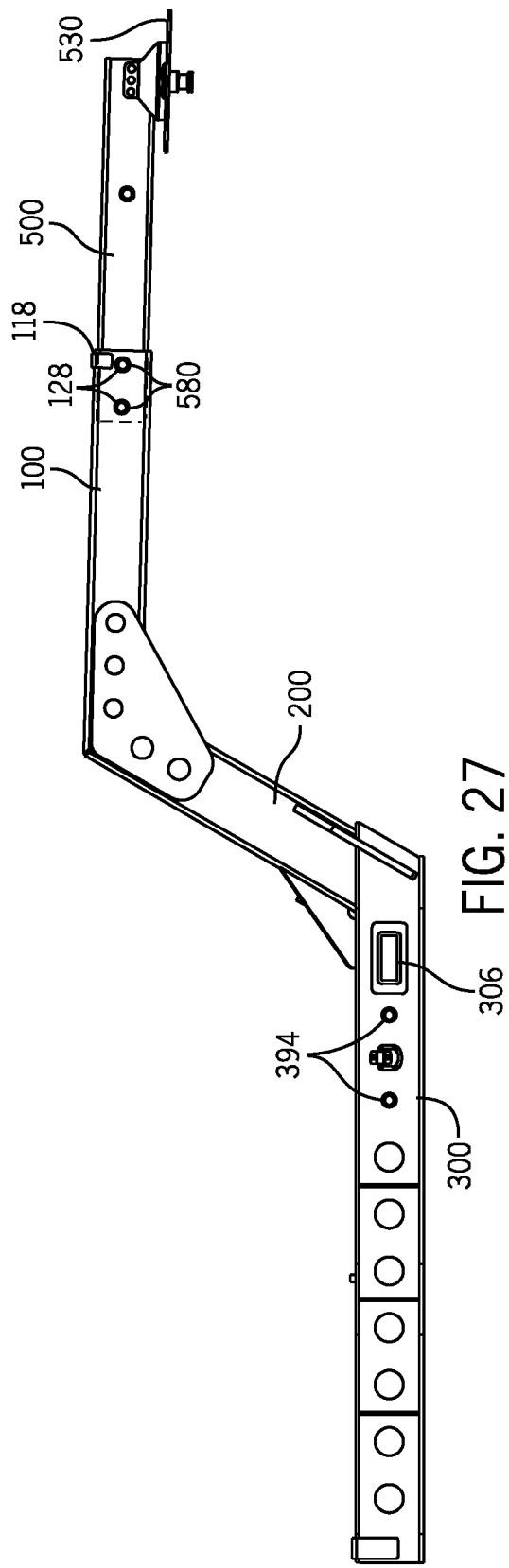

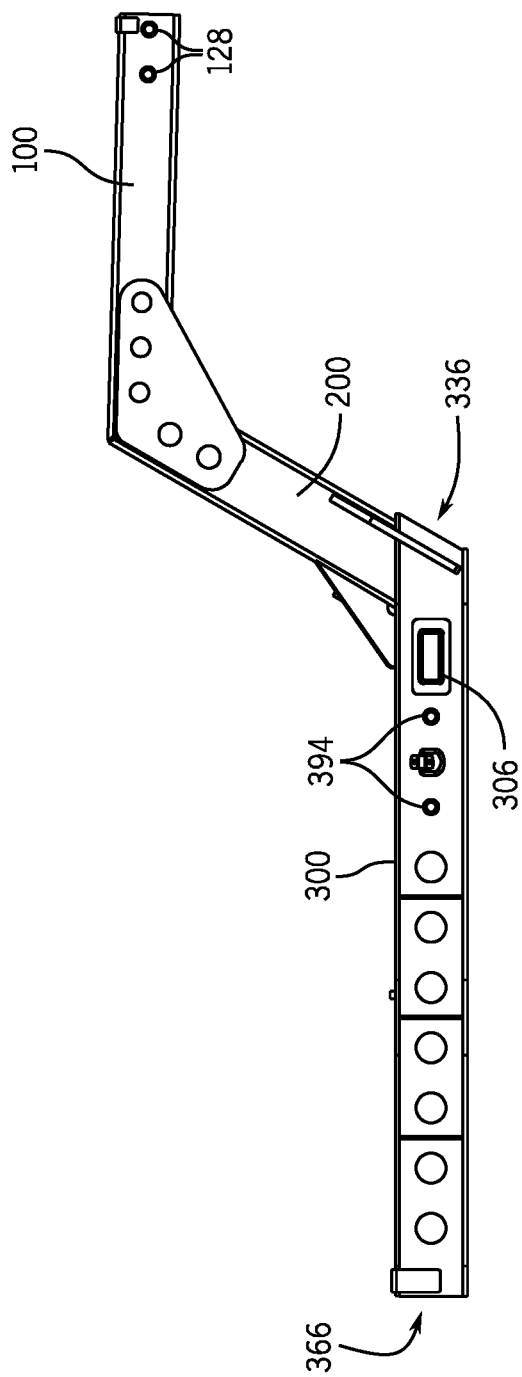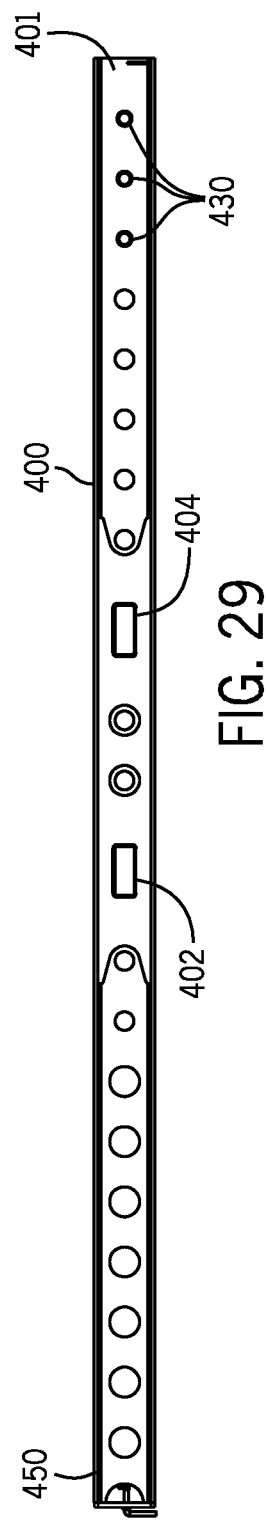

TRUCK TOWING SYSTEM

This application claims priority to U.S. Provisional Patent Application No. 63/145,591 filed Feb. 4, 2021.

FIELD OF INVENTION

The present invention relates to a truck towing system.

BACKGROUND OF INVENTION

Previous attempts of towing or transporting semi-trucks have used a method called "decking," in which a first truck tows a second truck with an axle assembly of the second truck positioned over a portion or frame of the first truck. The method does not work with many modern trucks that have an increased height, since a top of the second truck will be too high off of the ground resulting in problems passing through tunnels or under over-passes and possible violation of laws or regulations directed to maximum vehicle height.

Other attempts in towing semi-trucks use a method in which the truck that is being towed is towed in reverse. This method is fuel inefficient since the towed truck is moving in a direction counter to its aerodynamic design. Further, towing in reverse may damage the suspension or the air fairings of the towed truck.

U.S. Pat. Nos. 8,371,599, 8,876,139, and 9,636,957, all assigned to Truckmovers.COM, Inc. of Kansas City, Missouri are hereby incorporated by reference. These patents improve on the previous attempts in the towing of semi-trucks.

SUMMARY OF INVENTION

A truck towing system is herein described. The truck towing system provides for a first truck to tow a second truck in a back to front relationship, i.e., the front portion of the second truck (the towed truck) is connected or attached to a rear portion of the first truck (the towing truck). This allows the first truck to tow the second truck in a fuel-efficient manner, as trucks are not generally designed to be aerodynamic when driven in or pulled in a reverse direction.

The truck towing system is convertible for use between towing trucks with a saddle mounts, fifth wheel mounts, or other hitches and mounts. The towing system includes one or more connection assemblies that are configured to engage with the saddle mounts, fifth wheel mounts, or other hitches and mounts of the towing truck. For example, a first connection assembly may be removed from the towing system and replaced with a second connection assembly. The one or more connection assemblies are configured to operate with a specific mount of the towing truck, such as saddle mounts, fifth wheel mounts, or other hitches and mounts. Thus, a single truck towing system may be provided with different connection assemblies to match a specific mount of the towing truck. A front portion of the connection assembly removably engages or connects with the towing truck, while a rear portion of the connection assembly removably engages or connects with the remainder of the truck towing system.

The truck towing system also allows for the towed truck to be maintained at a height where a top surface or a roof of the towed truck is maintained below approximately 13 feet, 6 inches, which is a typical maximum height for safe clearance on most highways and interstates. Many of today's semi-trucks are built with cabins or condos above and behind the driver's seat in the cab. These areas may contain a bed or other storage area. These additions to the cab create extra height that must be accommodated by the towing equipment.

The truck towing system allows a single driver to move two or more trucks to a destination. This reduces labor and travel costs since two drivers are not required.

The truck towing system further provide for the towed truck to have its rear wheels on the ground, while its front wheels are lifted. This provides the driver of the first truck with better control over the second truck. This also reduces the likelihood of the towed trucked to start "snaking," which may result in a loss of control.

The truck towing system further is adjustable to accommodate different sized semi-trucks. The system may extend or retract depending on the length of the towed vehicle.

In another aspect, a truck towing system is provided. The truck towing system includes an upper member to removably connect with a first truck, a middle member, and a lower member. The middle member joins the upper member and the lower member. The lower member supports a front portion of a second truck. A beam member is engaged to the lower member to pass through a front opening and a rear opening of the lower member. The lower member defines an interior to receive the beam member. The beam member connects to a rear portion of the second truck. The lower member includes one or more sets of openings that are spaced along the length of the lower member. The beam member includes one or more sets of pin openings that are spaced along the length of the beam member. A locking pin passes through one of the sets of the openings in the lower member and one of the sets of the pin openings in the beam member to lock the beam member and the lower member together.

In another aspect, a method of connecting a truck towing system to a first truck and a second truck is provided. The method includes providing a towing system having an upper member that removably connects with the first truck, a middle member, and a lower member. The middle member joins the upper member and the lower member. The lower member supports a front portion of a second truck. A beam member is engaged to the lower member. The beam member connects to a rear portion of the second truck. The method further includes extending or retracting the beam member relative to the lower member. The method further includes locking the beam member and the lower member together. The method further includes positioning the second truck over the lower member and the beam member and locking a front axle assembly of the second truck to the lower member. The method further includes locking a rear frame of the second truck to the beam member and lifting the upper member. The method further includes attaching the first truck to the upper member of the towing system.

In another aspect, a method of storing a truck towing system is provided. The method includes providing a towing system having an upper member to removably connect with a first truck, a middle member, and a lower member. The middle member joins the upper member and the lower member. The lower member supports a front portion of a second truck. A beam member is engaged to the lower member. The beam member connects to a rear portion of the second truck. The method further includes retracting the beam member relative to the lower member through an interior of the lower member and through a front opening of the lower member.

In another aspect, a towing system that is convertible for use between towing trucks with a saddle mounts, fifth wheel mounts, or other hitches and mounts is described. The towing system includes one or more connection assemblies that are configured to engage with the saddle mounts, fifth wheel mounts, or other hitches and mounts of the towing truck. A front portion of the connection assemblies removably engages or connects with the towing truck. A rear portion of the connection assemblies removably engages or connects with an upper member of the towing system. The different connection assemblies are easily removable and may include front portions with kingpin or frame connection assemblies. The towed truck is engaged to the lower member of the towing system.

In another aspect, a truck towing system includes an upper member. A connection assembly is configured to removably engage or connect with a first truck. The connection assembly is configured to removably engage or connect with the upper member. A lower member joins the upper member in a fixed engagement. The lower member supports a front portion of a second truck. A beam member is engaged to the lower member. The beam member slides in and out of an interior of the lower member. The beam member is configured to connect to a rear portion of the second truck.

In another aspect, a truck towing system for use with a saddle mount or a kingpin mount is described. The truck towing system includes an upper member. A connection assembly is configured to removably engage or connect with a towing truck having the saddle mount or the kingpin mount. The connection assembly is a frame connection assembly or a kingpin connection assembly. The connection assembly is configured to removably engage or connect with the upper member. A lower member joins the upper member in a fixed engagement. The lower member is configured to support a front portion of a towed truck. A beam member is engaged to the lower member. The beam member is configured to connect to a rear portion of the towed truck.

In another aspect, a truck towing system includes an upper member configured to removably engage or connect with a first truck. A lower member joins the upper member in a fixed engagement. The lower member is configured to support a front portion of a second truck. A beam member is engaged to the lower member. The beam member slides in and out of an interior of the lower member. The beam member is configured to connect to a rear portion of the second truck. The beam member includes a first transport opening and a second transport opening. The lower member includes a third transport opening. The first transport opening, the second transport opening, and the third transport opening provide for access or entry points for a forklift, skid-steer, or other moving apparatus with a fork or arm members to engage with the towing system in order to lift and move the towing system. In certain aspects, the beam is withdrawn or retracted such that the first transport opening is aligned with the third transport opening in the lower member. In certain aspects, the second transport opening is outside of the lower member.

In another aspect, a method of converting a truck towing system for use with a saddle mount or a kingpin mount is described. The method includes providing an upper member and a lower member. The lower member joins the upper member in a fixed engagement. The lower member is configured to support a front portion of a towed truck. The method includes providing a beam member. The beam member is configured to engage to the lower member. The beam member slides in and out of an interior of the lower member. The beam member is configured to connect to a rear portion of the towed truck. The method includes engaging or connecting a frame connection assembly or a kingpin connection assembly with the upper member. The frame connection assembly and the kingpin connection assembly are configured to removably engage or connect with the saddle mount or the kingpin mount of a towing truck.

In another aspect, a method of configuring a truck towing system for use with either a saddle mount or a kingpin mount is described. The method includes providing an upper member and a lower member. The lower member joins the upper member in a fixed engagement. The lower member is configured to support a front portion of a towed truck. The method includes providing a beam member. The beam member is configured to engage to the lower member. The beam member slides in and out of an interior of the lower member. The beam member is configured to connect to a rear portion of the towed truck. The method includes selecting a frame connection assembly or a kingpin connection assembly. The frame connection assembly is configured to engage or connect with the saddle mount, and the kingpin connection assembly is configured to engage or connect with the kingpin mount. The method includes engaging or connecting the selected connection assembly with the upper member.

In another aspect, a method of moving a truck towing system is described. The method includes providing the truck towing system. The truck towing system including an upper member configured to removably engage or connect with a first truck. A lower member joins the upper member in a fixed engagement. The lower member is configured to support a front portion of a second truck. A beam member is engaged to the lower member. The beam member slides in and out of an interior of the lower member. The beam member is configured to connect to a rear portion of the second truck. The beam member includes a first transport opening and a second transport opening. The lower member includes a third transport opening. The method includes moving the beam member to align the first transport opening with the third transport opening. The method includes engaging the first transport opening, the second transport opening, and the third transport opening with a forklift, skid-steer, or other moving apparatus. In certain aspects, a first fork or arm and a second fork or arms generally simultaneously pass through or into the first transport opening, the second transport opening, and the third transport opening. In certain aspects, the first fork or arm of the moving apparatus passes through or into a combination of the first transport opening and the third transport opening, while the second fork or arm of the same moving apparatus passes through or into the second transport opening.

In another aspect, a method of configuring a truck towing system for use with either a saddle mount or a kingpin mount is described. The method includes providing an upper member and a lower member, wherein the lower member joins the upper member in a fixed engagement, the lower member configured to support a front portion of a towed truck. The method includes providing a beam member, the beam member fixedly engaged to the lower member, and the beam member configured to connect to a rear portion of the towed truck. The method includes selecting a frame connection assembly or a kingpin connection assembly, the frame connection assembly configured to engage or connect with the saddle mount, and the kingpin connection assembly configured to engage or connect with the kingpin mount. The method includes engaging or connecting the selected connection assembly with the upper member.

In another aspect, a method of converting a truck towing system for use with a saddle mount or a kingpin mount is described. The method includes providing an upper member and a lower member. The lower member joins the upper member in a fixed engagement. The lower member is configured to support a front portion of a towed truck. The method includes providing a beam member. The beam member is engaged to the lower member. The beam member is configured to connect to a rear portion of the towed truck. The method includes determining whether a towing truck has a saddle mount or a kingpin mount. The method includes engaging or connecting a frame connection assembly or a kingpin connection assembly with the upper member. The frame connection assembly is configured to removably engage or connect with the saddle mount of the towing truck. The kingpin connection assembly is configured to removably engage or connect with the kingpin mount of the towing truck.

In another aspect, a method of using of a truck towing system is described. The method includes providing an upper member and a lower member, wherein the lower member joins the upper member in a fixed engagement, and the lower member is configured to support a front portion of a towed truck. The method includes providing a beam member. The beam member is engaged to the lower member. The beam member is configured to connect to a rear portion of the towed truck. The method includes providing a frame connection assembly and a kingpin connection assembly. The method includes selecting the frame connection assembly or the kingpin connection assembly. The frame connection assembly is configured to engage a saddle mount of a towing truck. The kingpin connection assembly is configured to engage a kingpin mount of the towing truck. The method includes engaging the selected connection assembly with the upper member. The method includes engaging the selected connection assembly with the mount of the towing truck.

In another aspect, a kingpin connection assembly for a towing system is described. The kingpin connection assembly includes a tube. A coupler plate is mounted to a front portion of the tube. A kingpin is mounted to the coupler plate. A rear portion of the tube is configured to removably engage or connect with an upper member of a towing system. The rear portion of the tube includes one or more sets of openings passing through lateral sides of the tube. Removable fasteners are configured to hold the rear portion of the tube in a front portion of the upper member. The front portion of the upper member may include one or more sets of openings passing through lateral sides of the front portion, and the removable fasteners pass through the openings of the lateral sides of the tube and the openings of the lateral sides of the front portion.

In another aspect, a frame connection assembly for a towing system is described. The frame connection assembly includes a tube. A hitch tube is mounted to a lower surface of the tube generally perpendicular to the tube. A rear portion of the tube is configured to removably engage or connect with an upper member of a towing system. The rear portion of the tube includes one or more sets of openings passing through lateral sides of the tube. Removable fasteners are configured to hold the rear portion of the tube in a front portion of the upper member. The front portion of the upper member may include one or more sets of openings passing through lateral sides of the front portion, and the removable fasteners pass through the openings of the lateral sides of the tube and the openings of the lateral sides of the front portion.

DESCRIPTION OF FIGURES

FIG. 3 is a top view of the truck towing system with the frame connection assembly.

FIG. 4 is a side view of the truck towing system with the frame connection assembly.

FIG. 5 is a side view of the truck towing system with the frame connection assembly and the beam member in the collapsed configuration.

FIG. 11 is a perspective view of the frame connection assembly.

FIG. 12 is a top view of the frame connection assembly.

FIG. 13 is a bottom view of the frame connection assembly.

FIG. 24 is a top view of the towing system with the frame connection assembly installed.

FIG. 25 is a side view of the towing system with the frame connection assembly installed.

FIG. 26 is a top view of the towing system with the kingpin connection assembly installed.

FIG. 27 is a side view of the towing system with the kingpin connection assembly installed.

FIG. 28 is a side view of the towing system with the beam member removed.

FIG. 29 is a side view of the beam member.

DETAILED DESCRIPTION OF INVENTION

Figure 1:
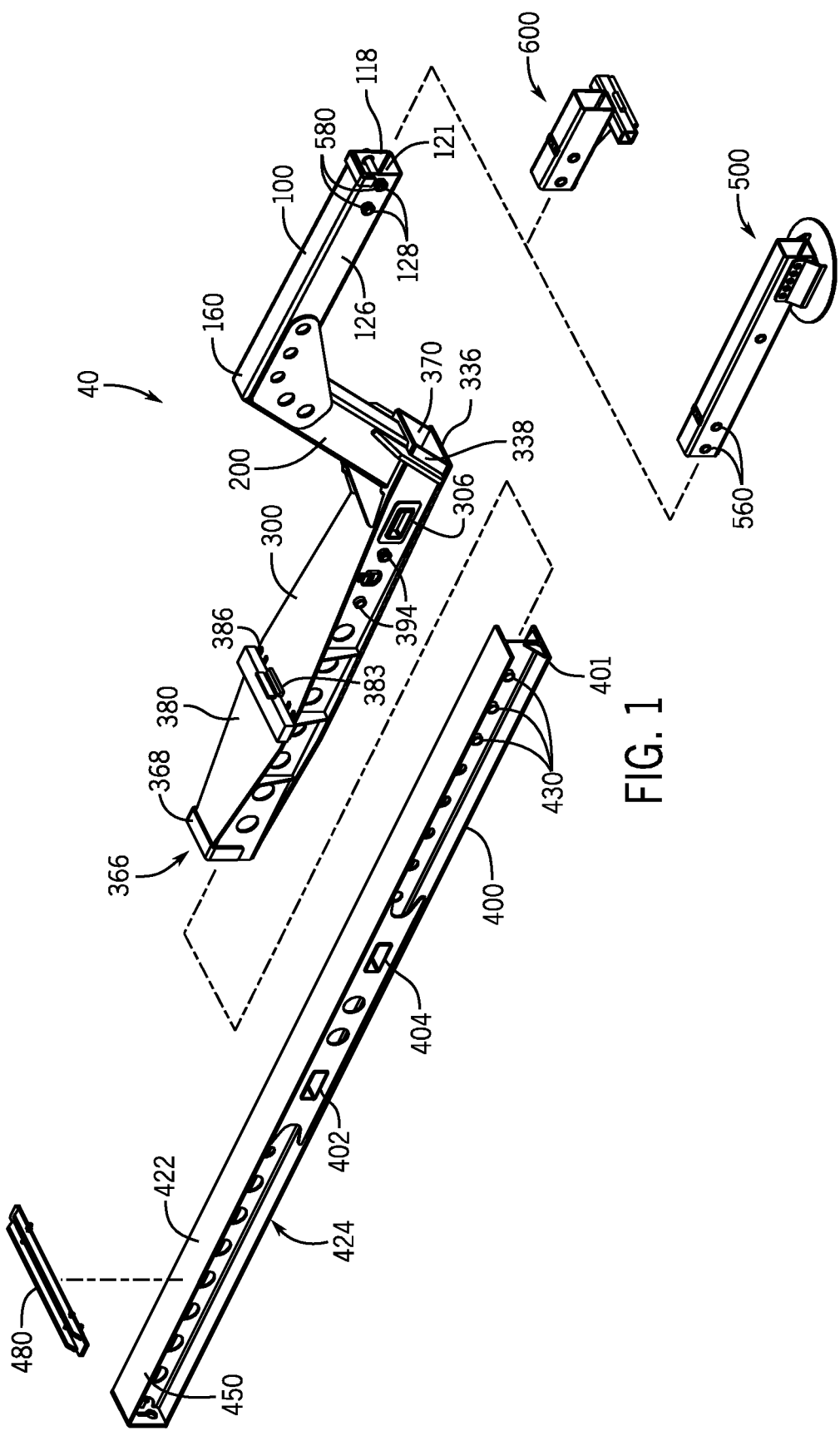
FIG. 1 is a perspective view of the truck towing system with the interchangeable frame connection assembly and kingpin connection assembly.

A truck towing system 40 will now be described with reference to the FIGURES. A truck towing system 40 is shown in FIG. 1 with a kingpin connection assembly 500 and a frame connection assembly 600. The kingpin connection assembly 500 and the frame connection assembly 600 may be removed from and interchangeably used with the truck towing system 40 depending upon the towing set-up needed by a user.

The towing system 40 includes an upper member 100 that is configured to removably connect or engage with the kingpin connection assembly 500 and the frame connection assembly 600. The frame connection assembly 600 connects to a saddle mount 15 of a first truck 10, while the kingpin connection assembly 500 connect to a fifth wheel mount (not shown) of the first truck 10 or a different truck. Thus, the truck towing system 40 may be used with towing trucks having either a saddle mount or a fifth wheel mount by switching between the kingpin connection assembly 500 and the frame connection assembly 600.

Figure 6:
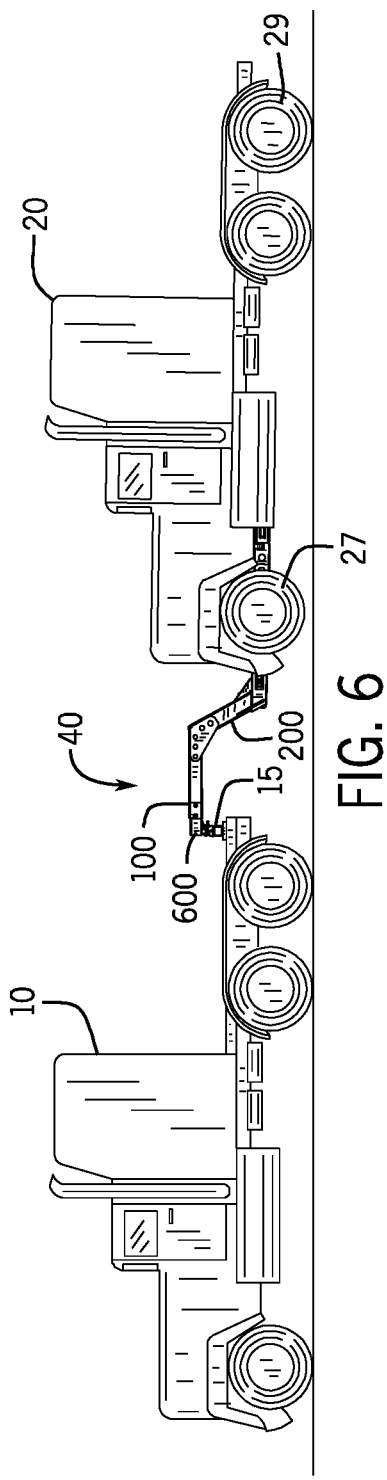
FIG. 6 is a view of the first truck towing the second truck with the truck towing system with the frame connection assembly.
Figure 7:
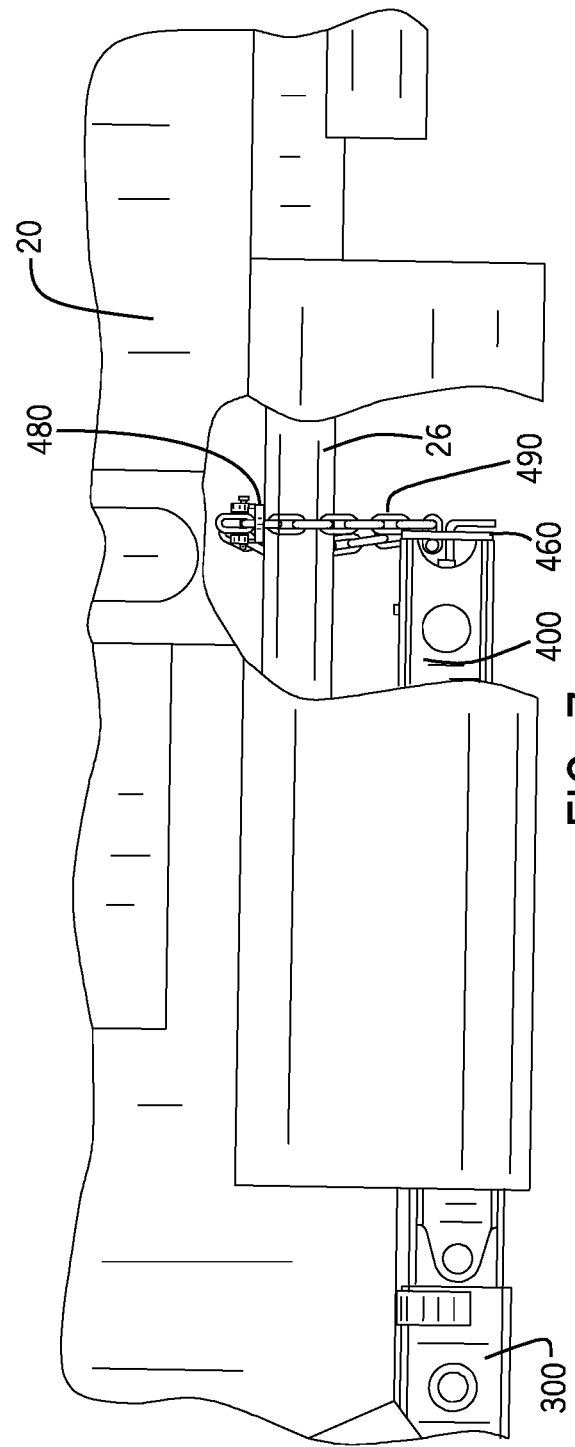
FIG. 7 is a side view of the connection at the rear portion of the second truck.
Figure 8:
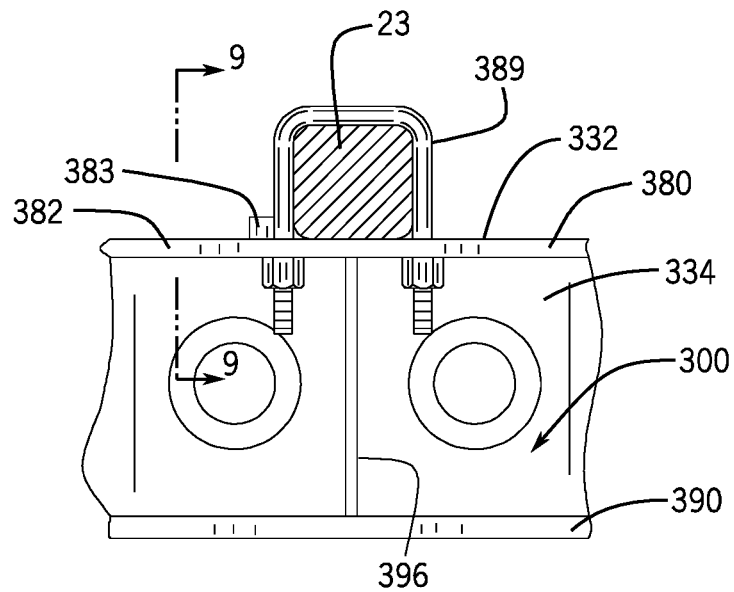
FIG. 8 is a side sectional view of the connection at the rear portion of the second truck.

With reference to FIG. 6, the system 40 connects to a rear portion of the first truck 10 and to a front portion of a second truck 20. The first truck 10 is the towing truck, while the second truck 20 is the towed truck. The second truck 20 is towed in a forward direction. A third truck may also be towed by the second truck 20 in a similar manner.

The first truck 10 includes the saddle mount 15, which receives the towing system 40 in a fixed and locking connection. A front axle assembly 23 of the second truck 20 rests on the towing system 40. A rear frame 26 of the second truck 20 is locked, by chains or otherwise clamping, to the system 40. Rear wheels tandem 29 of the second truck 20 are in contact with the ground and roll as the first truck 10 pulls or tows the second truck 20. Accordingly, the second truck 20 is being pulled in the direction in which the second truck 20 was aerodynamically designed. As such, pulling the second truck 20 in the forward direction results in fuel economy savings as the first truck 10 is performing reduced work verses towing the second truck 20 in a backward manner. In this aspect, a front portion 118 of the upper member 100 engages with or receives either the kingpin connection assembly 500, the frame connection assembly 600, or another style of connection assembly.

The towing system 40 includes the upper member 100, a middle member 200, and a lower member 300. Each of the members 100, 200, and 300 include a generally linear length of a rigid and strong metal or metal alloy. Each of the members 100, 200, and 300 may be formed from solid, hollow or partially hollow sections of square tubing or stock. The members 100, 200, and 300 may be made from low to medium strength carbon steel. The upper member 100 is connected to the middle member 200, and the middle member 200 is connected to the lower member 300. The upper member 100, the middle member 200, and the lower member 300 may be fixedly connected to each other, or the members 100, 200 and 300 may be an integral structure. In the aspect shown in the FIGURES, the upper member 100 is welded to the middle member 200, and the middle member 200 is welded to the lower member 300. Typically, none of the upper member 100, the middle member 200, and the lower member 300 move or pivot relative to each other.

The upper member 100 is orientated in a range of approximately parallel to the lower member 300 or slightly angling toward a plane of the lower member 300 in an amount of approximately 2 degrees to 5 degrees in the direction attaching toward the first truck 10. The upper member 100 is separated from the lower member 300 by the middle member 200. The middle member 200 joins an end of the upper member 100 with an end of the lower member 300.

Figure 2:
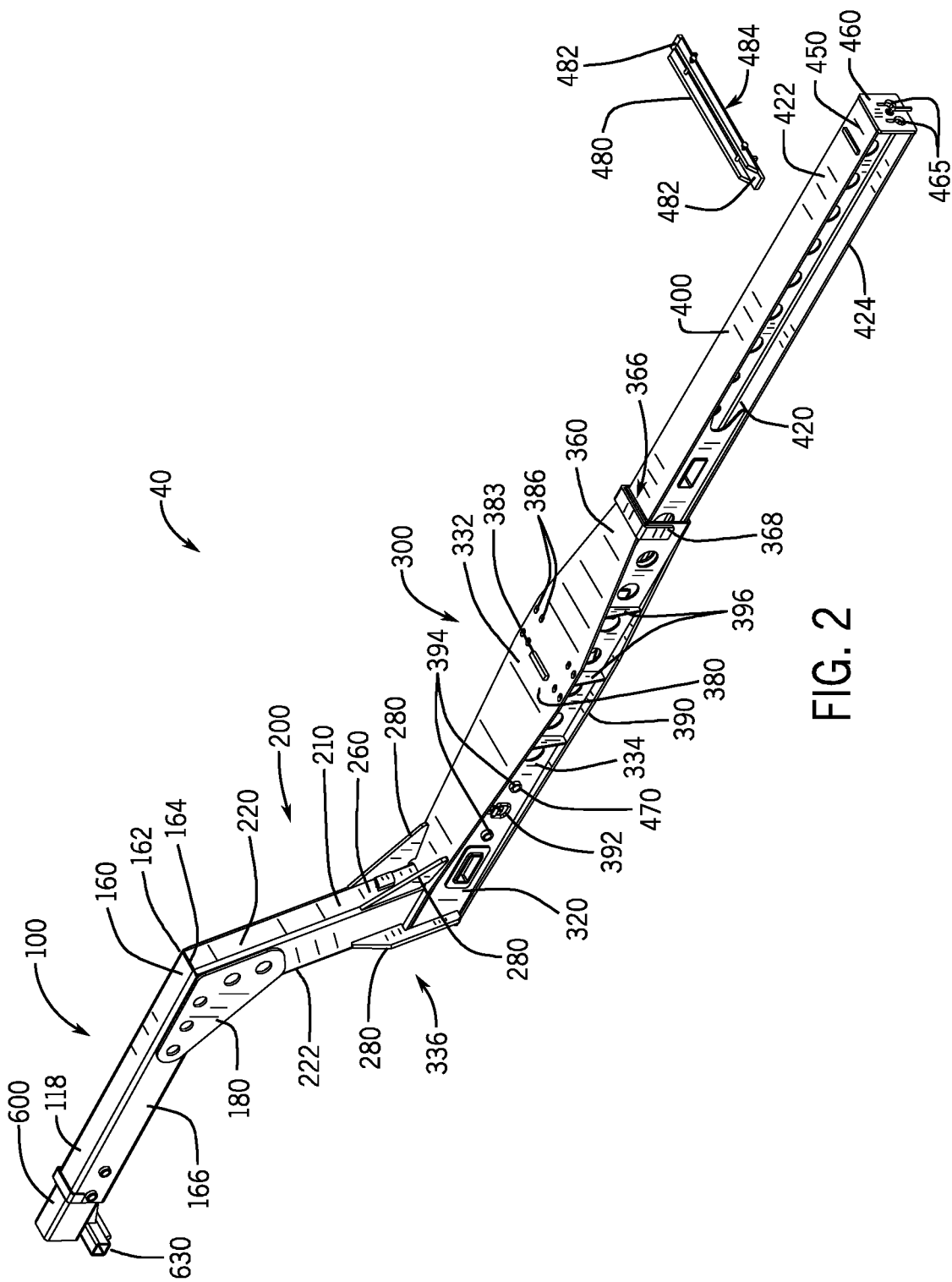
FIG. 2 is a perspective view of the truck towing system with the frame connection assembly.

With reference to FIG. 2, the upper member 100 includes the front portion 118 and a rear portion 160. The kingpin connection assembly 500 and the frame connection assembly 600 removably connect or removably engage to the front portion 118. The frame connection assembly 600 removably connects or engages to the saddle mount 15 of the first truck 10. The kingpin connection assembly 500 removably connects or engages to a fifth wheel mount (not shown) of the first truck 10.

The rear portion 160 of the upper member 100 includes a rear end 162 that defines rear surfaces 164. The rear end 162 and the rear surfaces 164 are fixedly engaged or connected by welding or other fasteners to the middle member 200. The upper member 100 further includes side surfaces 166. Connecting plates 180 connect the side surfaces 166 of the upper member 100 with side surfaces 222 of the middle member 200. The connecting plates 180 strengthen or reinforce the connection or bond between the upper member 100 and the middle member 200.

The middle member 200 includes an upper portion 220 and a lower portion 260. The upper portion 220 is fixed or connected to the rear portion 160 of the upper member 100. The middle member 200 is fixed or connected to the upper member 100 at an angle of approximately 100 degrees to approximately 150 degrees. This range of angles provides for the lower member 300 to be at the proper position for connecting to the second truck 20. With reference to FIGS. 2 and 3, the upper portion 220 includes an upper surface 210, the side surfaces 222, and the rear surface 230. The upper surface 210 receives angled support plates 280 in a fixed or permanent connection that further connects the middle member 200 with the lower member 300.

The lower member 300 will now be described with reference to FIG. 2. The lower portion 260 of the middle member 200 is fixed or connected to a front portion 320 of the lower member 300. The middle member 200 is fixed or connected to the lower member 300 at an angle of approximately 100 degrees to approximately 150 degrees. The lower member 300 includes the front portion 320 and a rear portion 360. The front axle assembly 23 of the second truck 20 is positioned or mounted on a top surface 332 of the lower member 300.

The lower member 300 further includes a front opening 336 and a rear opening 366. The front opening 336 is positioned below the middle member 200. A front end 401 of the beam member 400 is inserted into the rear opening 366 of the lower member 300. The beam member 400 may be inserted nearly or all the way through an interior 370 of the lower member 300. The front end 401 of the beam member 400 may slide or pass through the front opening 336, such that a substantial portion of the beam member 400 is positioned beneath the upper member 100.

The front opening 336 is provided with a reinforcing collar 338 that strengthens the front opening 336. Likewise, the rear opening 366 is strengthened with a reinforcing collar 368. The reinforcing collars 338 and 368 may circumscribe or nearly fully surround the front opening 336 and the rear opening 366, respectively The lower member 300 further includes a side surface 334. The side surface 334 defines pin openings 394. The pin openings 394 provide for a pin 470 to pass through the lower member 300 of the towing system 40 and through the beam member 400 in order to lockingly fix the beam member 400 in position in the interior 370 of the lower member 300. The lower member 300 further includes vertical supports 396 that further strengthen the lower member 300. The vertical supports 396 are welded to a top widened support plate 380 and to a bottom widened support plate 390.

The side surface 334 further includes chain mounting members 392 to receive a transport chain 395 or other hoisting or lifting apparatus, which may be used to lift or hoist the assembly 50. The chain mounting members 392 provide a connection point for chains or other hoisting implements in order for an operator to attach or connect to the towing system 40 and lift the towing system 40.

With reference to FIG. 2, the top widened support plate 380 is shown. The top widened support plate 380 includes an axle stop 383 and holes 386. In the embodiments shown in the FIGURES, U clamps 389 pass over the front axle assembly 23 and insert through the holes 386 and are fastened in place with locking nuts, locking pins, etc. The top widened support plate 380 provides a broad surface for the front axle assembly 23 to rest upon. As the top widened support plate 380 widens as it approaches the axle stop 383, a broad base is provided for the front axle assembly 23 of the second truck 20 that reduces rocking or shaking of the second truck 20 when it is positioned on the top widened support plate 380 of the lower member 300.

A lower surface of the top widened support plate 380 is welded to the vertical supports 396, while an upper surface of the bottom widened support plate 390 is welded to the vertical supports 396. The vertical supports 396 are further welded to the side surfaces 334 of the lower member 300. In other embodiments, the front axle assembly 23 may be positioned on the top widened support plate 380 and fastened with chains, bolts, fasteners, or other conventional mechanical apparatus that may be used to attach the front axle assembly 23 to the lower member 300.

The beam member 400 will now be described with reference to FIGS. 2 and 5. The beam member 400 includes the front end 401 and the rear end 450. As shown in FIG. 5, pin openings 430 are positioned on an exterior of the beam member 400 and travel through the interior width of the beam member 400. The beam member 400 may include an I-beam construction with an upper surface 422 and a lower surface 424. A vertical support plate 420 further supports the upper surface 422 and the lower surface 424 of the beam member 400. The vertical support plate 420 reinforces and strengthens the beam member 400.

A crossbar 480 assists in connecting a rear portion of the second truck 20 to the assembly 50. The rear end 450 of the beam member 400 includes a chain receiving member 460 that is fixedly attached to the crossbar 480. A chain 490 connects lateral portions 482 of the crossbar 480 to the chain receiving member 460. The crossbar 480 rests on a rear frame 26 of the second truck 20. Specifically, a bottom surface 484 of the crossbar 480 rests over the top of the rear frame 26, while the chain 490 holds the beam member 400 to the crossbar 480. The chain receiving member 460 may be attached or integral in a fixed engagement to the rear end 450 of the beam member 400. The chain receiving member 460 includes the chain openings 465 that receive the chain 490. In other embodiments, the chain receiving member 460 may include other mechanical structure or components to affix to the chain 490. The length of the chain 490 may be adjusted to raise or lower the rear of second truck 20. Generally, the front and rear sets of the rear wheels tandem 29 of the second truck 20 should be in contact with the ground to provide better control and braking of the second truck 20. The length of chain 490 between the crossbar 480 and the chain receiving member 460 may be lengthened to lower the front set of the rear wheels tandem 29. Likewise, the length of chain 490 between the crossbar 480 and the chain receiving member 460 may be shortened to raise the front set of the rear wheels tandem 29.

Figure 9:
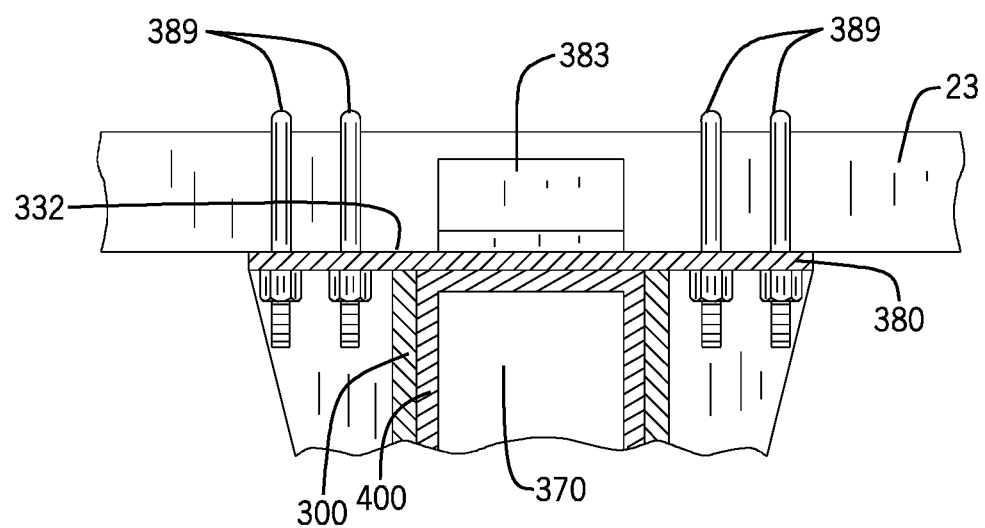
FIG. 9 is a front sectional view of the connection at the rear portion of the second truck.
Figure 10:
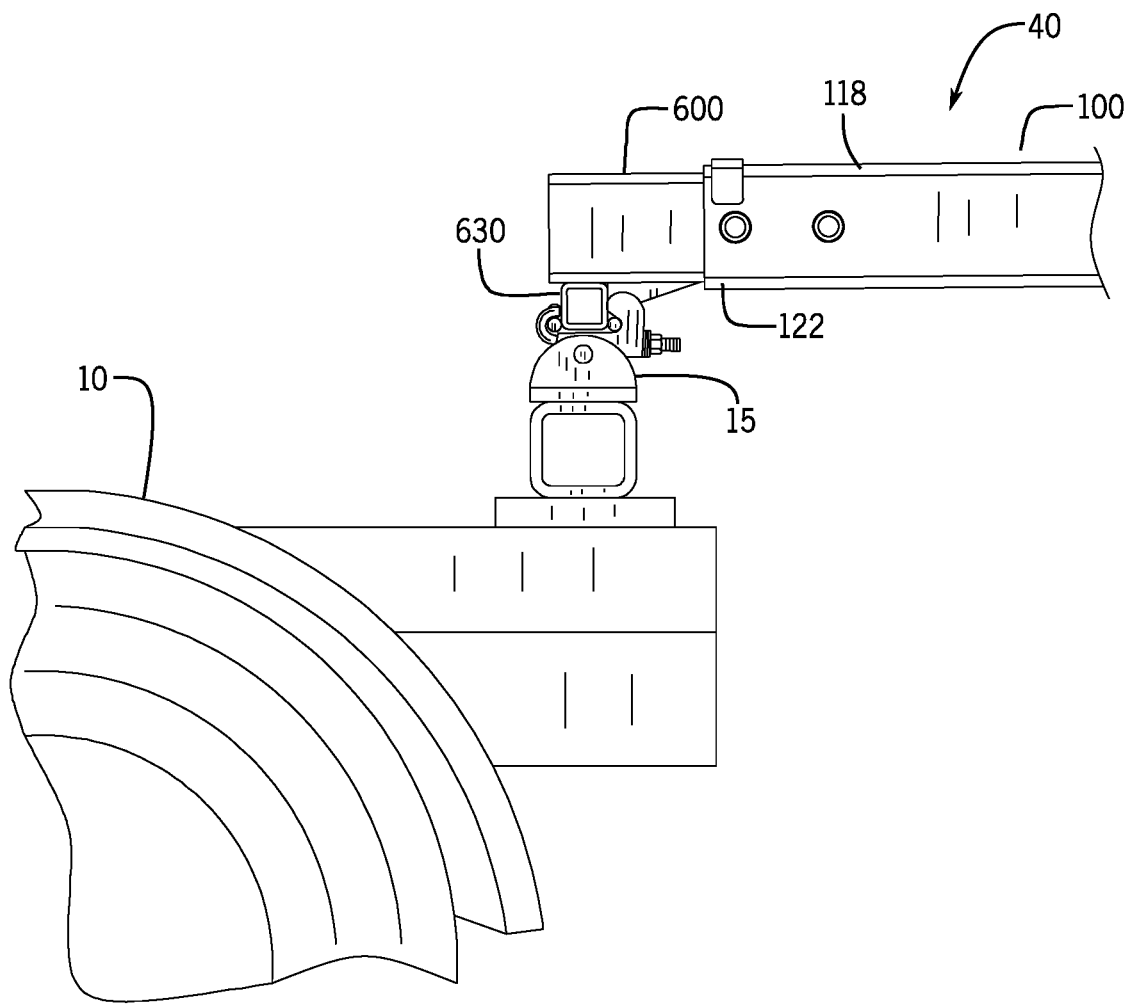
FIG. 10 is a side view of the connection to the frame connection assembly at the rear portion of the first truck.
Figure 14:
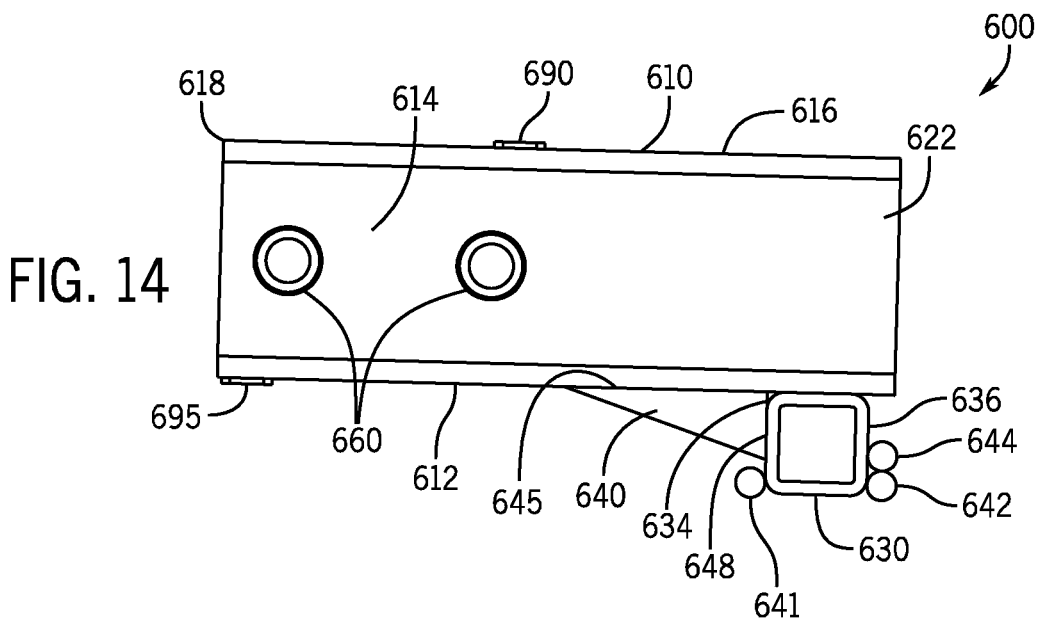
FIG. 14 is a side view of the frame connection assembly.
Figure 15:
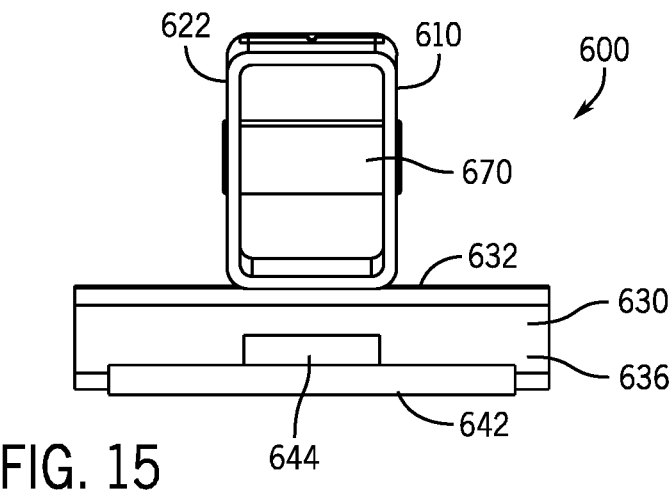
FIG. 15 is a front view of the frame connection assembly.
Figure 16:
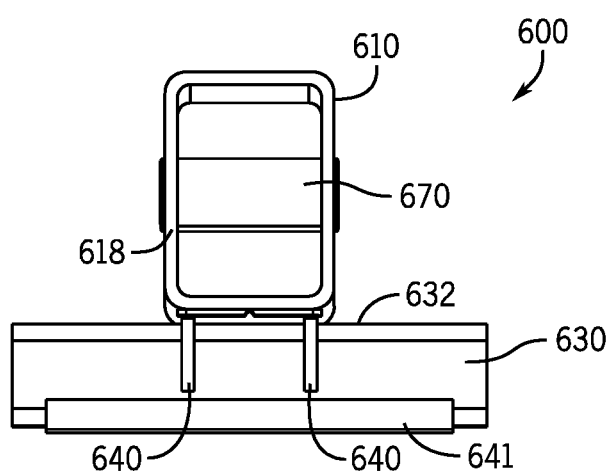
FIG. 16 is a rear view of the frame connection assembly.

With reference to FIG. 5, the beam member 400 is adjustable in length relative to the lower member 300. The overall length of the towing system 40 may be adjusted by extending and withdrawing the beam member 400 relative to the lower member 300. The beam member 400 slides in and out of the interior 370 of the lower member 300. The upper surface 422 and the lower surface 424 of the beam member 400 may slide against the interior surfaces of the lower member 300. The circumference or outer surfaces of the beam member 400 should be just smaller than the interior circumference or inner surface of the lower member 300 such that the beam member 400 is held in a secure engagement. As shown in FIG. 9, the lower member 300 and beam member 400 may have box or square cross-sections that provide support and strength to the assembly 40. The operator may select one of the one or more sets of the pin openings 394 that are spaced along the length of the lower member 300. The operator may further choose one of the one or more sets of the pin openings 430 along the length of the beam member 400. This allows a range of length of the towing system 40 that may be used to accommodate different size or types of semi-trucks.

The beam member 400 may be withdrawn through the interior 370 of the lower member 300 and through the front opening 336 such that much of the beam member 400 is directly underneath the upper member 100. This allows the towing system 40 to collapse into a more convenient storage size. The towing system 40 may further lock in the collapsed configuration.

The semi-trucks that may be towed with the towing saddle system 40 may weigh approximately 5,000 to approximately 10,000 pounds. The towing system 40 may weigh approximately 1,600 pounds. The beam member 400 includes at least one set of the pin openings 430 and may include up to five or six sets of the pin openings 430. The lower member 300 includes at least one set of the pin openings 394 and up to approximately five or six sets of the pin openings 394.

The towing system 40, when using an extendable version of the beam member 400, provides a range of extension between 0 and approximately 3 linear feet to accommodate a variety of different semi-trucks. When the towing system 40 is in the fully extended configuration, it has an overall length of approximately 18 feet. When the towing system 40 is in the collapsed configuration, it has an overall length of approximately 10 feet. Of course, the kingpin connection assembly 500 and/or the frame connection assembly 600 may be used with other towing systems that do not have an extendable beam member. Thus, the kingpin connection assembly 500 and/or the frame connection assembly 600 may be used with both extendably engaged beam members and with fixedly engaged beam members. For example, the kingpin connection assembly 500 and/or the frame connection assembly 600 may be used with towing systems that have a generally fixed or non-moveable beam or other lower portion that engages a rear of the towed truck. For example, the fixed beam may be welded, bolted, otherwise generally permanently engaged to the remainder of the towing system. For example, the kingpin connection assembly 500 and/or the frame connection assembly 600 may be used with towing systems having no beam member.

The method of operation of the towing system 40 will now be described. First, the towing system 40 is laid flat on the ground. The beam member 400 is extended or retracted relative to the lower member 300 until it is at the proper length for the second truck 20. The pin 470 is then inserted through the pin openings 394 in the lower member 300 and through the pin openings 430 of the beam member 400. The pin 470 is locked in place via a cotter pin, nut or the like. Next, the second truck 20 is driven over the lower member 300 and the beam member 400. Next, the U clamps 389 are positioned over the front axle assembly 23 and tightened such that the front axle assembly 23 is clamped or fixed to the lower member 300. Next, the crossbar 480 is passed over the rear frame 26 of the second truck 20, and the chain 490 connects the crossbar 480 with the chain receiving member 460.

In one aspect, a crane, hoist, or other lifting implement next lifts the upper member 100 to a sufficient height to where the first truck 10 may back or move underneath the saddle mount portion 124. Next, the upper member 100 is lowered until the hitch tube 630 is positioned in the saddle mount 15 of the first truck 10. The hitch tube 630 is then locked to the saddle mount 15. As such, the towing system 40 is now connected to the first truck 10, and the second truck 20 is supported via the towing system 40. The rear wheels tandem 29 of the second truck 20 are in contact with the ground, while the front wheels 27 of the second truck 20 are approximately 6" to approximately 12" off and above the ground. In other aspects, as further described below, the beam member 400 may include a first transport opening 402 and a second transport opening 404 that are complementary or matching to a third transport opening 306 in the lower member 300. The transport openings 402, 404, and 306 provide for access entry points for a forklift, skid-steer, or other moving apparatus with a fork or arm members to engage with the towing system 40 in order to lift and move the towing system 40.

With reference to FIG. 5, the towing system 40 collapses to a collapsed configuration for efficient storage and convenient maneuverability. The beam member 400 is withdrawn or retracted through the interior 370 of the lower member 300 and through the front opening 336 such that much of the beam member 400 is directly underneath the upper member 100. The beam member 400 may be locked in place with the pin 470. In this collapsed configuration, a center of gravity of the towing system 40 is positioned approximately in the middle of the collapsed towing system 40. The chain mounting members 392 provide the connection point for chains or other hoisting implements in order for an operator to attach or connect to the towing system 40 and lift the towing system 40. Thus, the towing system 40 may be safely lifted at its middle point without the towing system 40 twisting or torquing on the transport chain 395. Due to its compact size, up to approximately 25 of the towing systems 40 may be stored on a standard flatbed trailer. Of course, the transport openings 402, 404, and 306 also provide for access entry points for a forklift, skid-steer, etc. lift and move the towing system 40.

The towing system 40 is convertible for use between towing trucks with a saddle mounts, fifth wheel mounts, or other hitches and mounts. The towing system 40 may include one or more connection assemblies that are configured to engage with the saddle mounts, fifth wheel mounts, or other hitches and mounts of the towing truck. For example, a first connection assembly may be removed from the towing system 40 and replaced with a second connection assembly. The one or more connection assemblies are configured to operate with a specific mount of the towing truck, such as saddle mounts, fifth wheel mounts, or other hitches and mounts. Thus, a single towing system 40 may be provided with different connection assemblies to match the mount of the towing truck. A front portion of the connection assemblies removably engages or connects with the first truck 10. A rear portion of the connection assemblies removably engages or connects with the upper member 100 of the towing system 40.

With respect to FIG. 1, the towing system 40 includes the upper member 100 with the front portion 118 that is configured to removably connect or engage to the saddle mount 15 of the first truck 10 or to a fifth wheel mount (not shown) of the first truck 10 or to the saddle mount or to the fifth wheel mount of a different truck. In this aspect, the front portion 118 engages with or receives either the kingpin connection assembly 500 or the frame connection assembly 600. Of course, other connection assemblies may be used with upper member 100. The kingpin connection assembly 500 is used when the first truck 10 (or other towing truck) has the fifth wheel mount installed. The frame connection assembly 600 is used when the first truck 10 (or other towing truck) has the saddle mount 15 installed. The kingpin connection assembly 500 and the frame connection assembly 600 may be used with the upper member 100. With respect to FIGS. 2-5, the upper member 100 is shown with the frame connection assembly 600.

The kingpin connection assembly 500 and the frame connection assembly 600 are removably connected or engaged to the upper member 100 of the towing system 40. The kingpin connection assembly 500 and the frame connection assembly 600 are interchangeable depending upon the preferred or available mount on the towing truck. The same towing system 40 may user either the kingpin connection assembly 500 or the frame connection assembly 600 depending on whether the towing truck has a fifth wheel mount or saddle mount. As such, the towing system 40 may be easily converted to connect to either a fifth wheel mount or saddle mount. These features improve efficiency, reduces costs, and saves time. Further, the towing system 40 may be repeatedly converted or changed for use for with either the fifth wheel mount or the saddle mount. The kingpin connection assembly 500 and the frame connection assembly 600 may be readily installed by sliding either the kingpin connection assembly 500 or the frame connection assembly 600 into the upper member 100.

In this aspect, the front portion 118 of the upper member 100 of the towing system 40 is generally hollow and serially receives either the kingpin connection assembly 500 or the frame connection assembly 600. Thus, the towing system 40 is convertible for use with two different styles of mounting, i.e., the saddle mount 15 or the fifth wheel mount.

The kingpin connection assembly 500 will now be described with reference to FIGS. 17-23. The kingpin connection assembly 500 includes a tube 510. The tube 510 is a generally linear member. A coupler plate 530 is mounted to a front portion 511 of the tube 510. In this aspect, the coupler plate 530 is mounted below a lower surface 513 of the tube 510 at the front portion 511 of the tube 510. In this aspect, mounting gussets 540 are welded to lateral sides 514 of the tube 510 and to the coupler plate 520. The tube 510 slides into a generally hollow interior 121 of the front portion 118 of the upper member 100. In this aspect, a rear portion 518 of the tube 510 slides into the generally hollow interior 121 of the front portion 118 of the upper member 100. The rear portion 518 of the tube 510 has an outer diameter less than an inner diameter of the front portion 118 of the upper member 100. The tube 510 may include a larger outer diameter closer to the front portion 511 of the tube 510.

The coupler plater 530 includes a generally circular outer diameter 532. A kingpin 550 is mounted to the coupler plate 530. The kingpin 550 lockingly engages with the fifth wheel mount. With respect to FIGS. 21 and 22, in this aspect, the kingpin 550 includes a mounting plate portion 552 and the kingpin portion 556. The kingpin portion 556 passes through a central circular opening 533 of the coupler plate 530, and the mounting plate portion 552 is welded or otherwise fastened to the coupler plate 530, with the kingpin portion 556 pointing downward. The mounting plate portion 552 has an outer diameter 558 generally larger than the central circular opening 533 of the coupler plate 530. The lower surfaces 542 of the mounting gussets 540 are welded to an upper surface 536 of the coupler plate 530. In this aspect, the lower surfaces 542 of the mounting gussets 540 are welded to the upper surface 536 of the coupler plate 530 just outside of the mounting plate portion 552. The lower surfaces 542 of the mounting gussets 540 may be shaped or configured to not contact the mounting plate portion 552 of the kingpin 550.

The rear portion 518 of the tube 510 includes one or more sets of openings 560 passing through the lateral sides 514 of the tube 510. Similarly, the front portion 118 of the upper member 100 includes one or more sets of openings 128 passing through lateral sides 126 of the front portion 118. Removable fasteners, such a bolts, pins, rods, etc. pass through the openings 128 and the openings 560 and are fastened in place. In the aspect shown in the FIGS, pin sleeves 570 are aligned with the openings 560. Linch pins 580 pass through the openings 560, the openings 128, and an inner diameter of the pin sleeves 570 to affix the kingpin connection assembly 500 to the front portion 118 of the upper member 100. The linch pins 580 may receive a cotter pin assembly or other lock to hold the linch pins 580 in place.

The kingpin connection assembly 500 may be formed from solid, hollow or partially hollow sections of square tubing, round tubing, or stock. If the kingpin connection assembly 500 is formed from solid carbon steel, then the one or more sets of openings 560 are bored through the width of the tube 510. The kingpin connection assembly 500 may be made from low to medium strength carbon steel.

Figure 17:
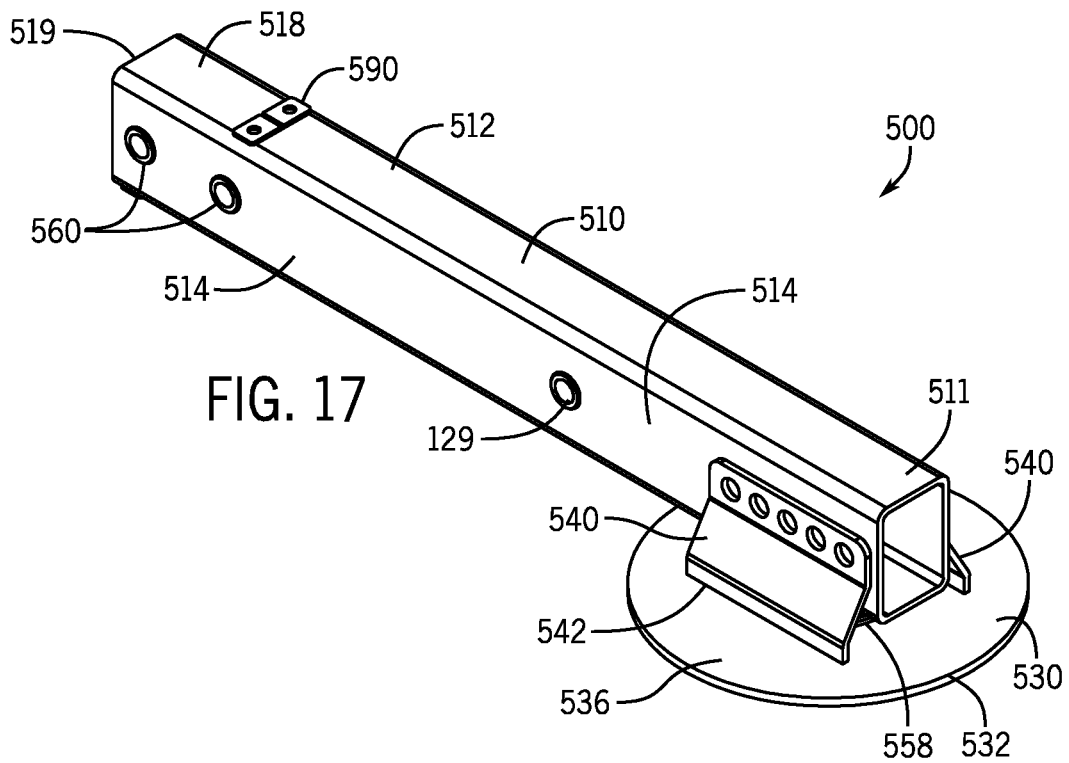
FIG. 17 is a perspective view of the kingpin connection assembly.
Figure 18:
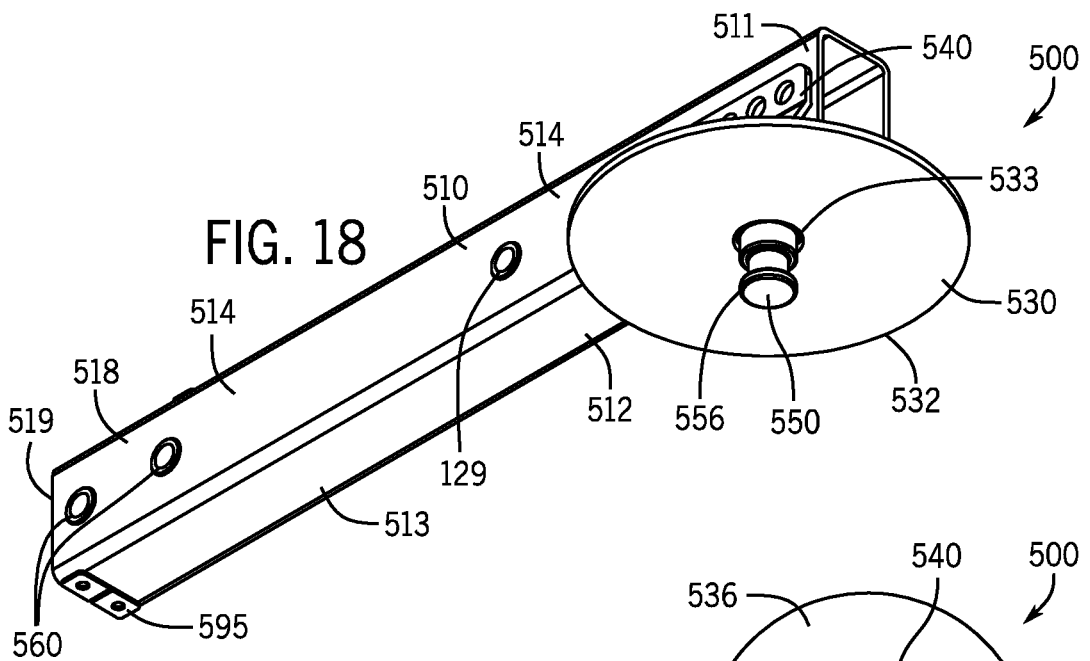
FIG. 18 is a lower perspective view of the kingpin connection assembly.
Figure 19:
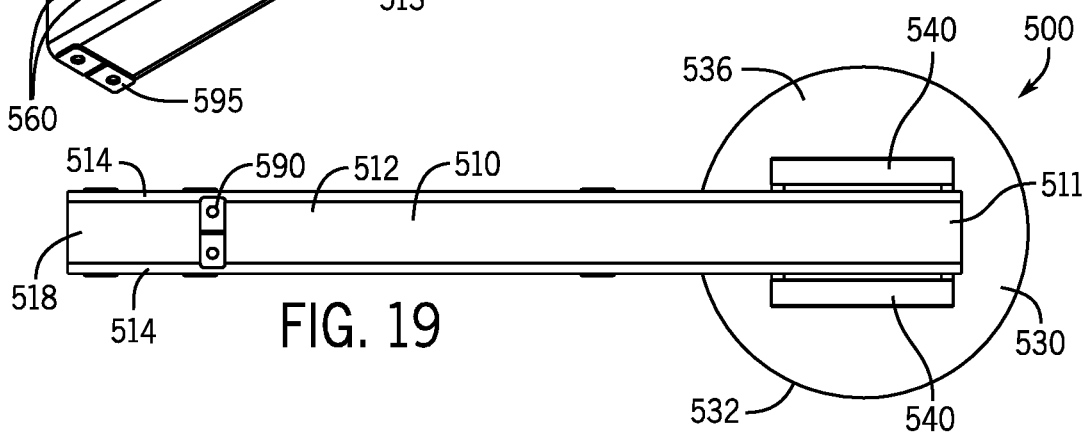
FIG. 19 is a top view of the kingpin connection assembly.
Figure 20:
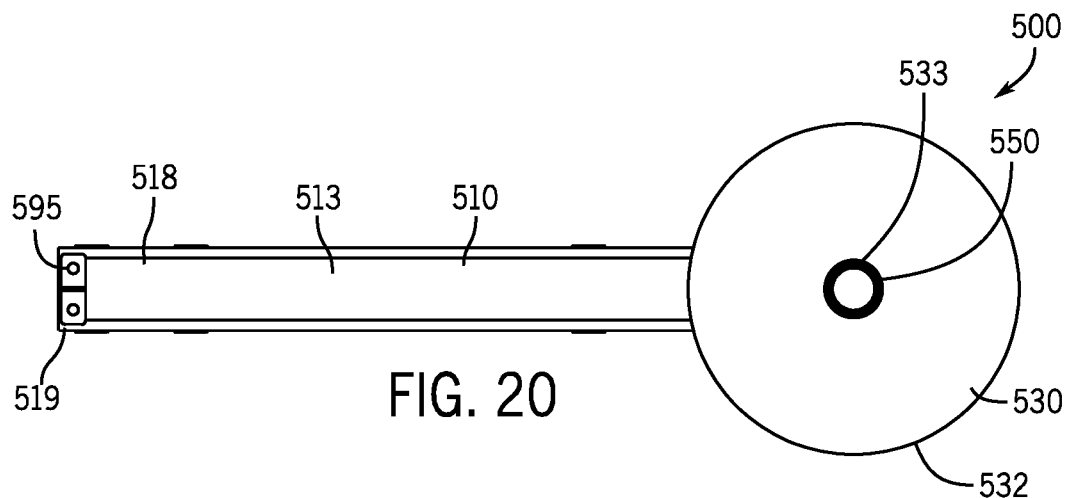
FIG. 20 is a bottom view of the kingpin connection assembly.
Figure 21:
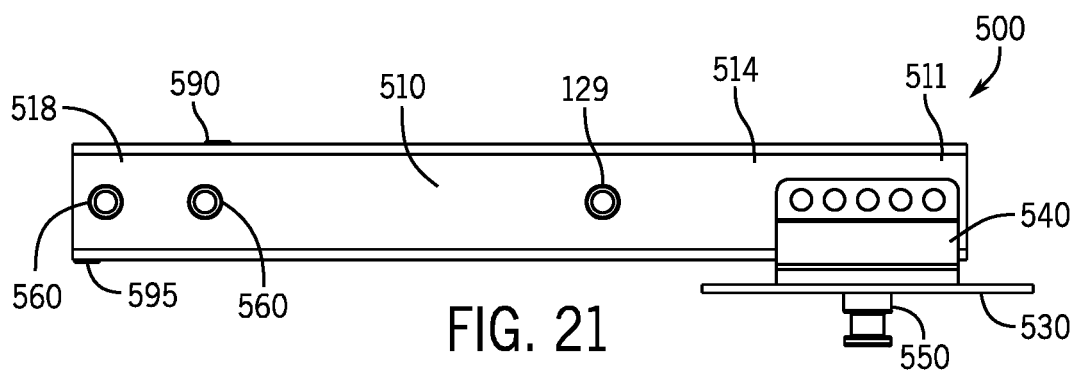
FIG. 21 is a side view of the kingpin connection assembly.
Figure 22:
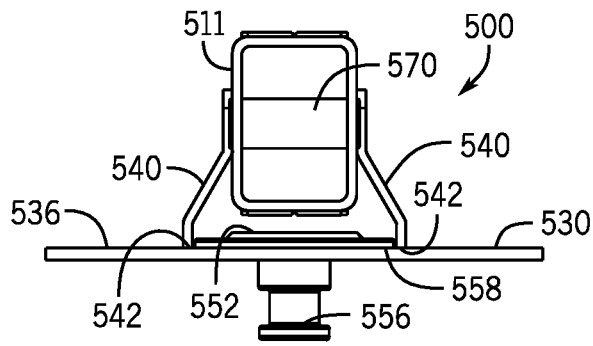
FIG. 22 is a front view of the kingpin connection assembly.
Figure 23:
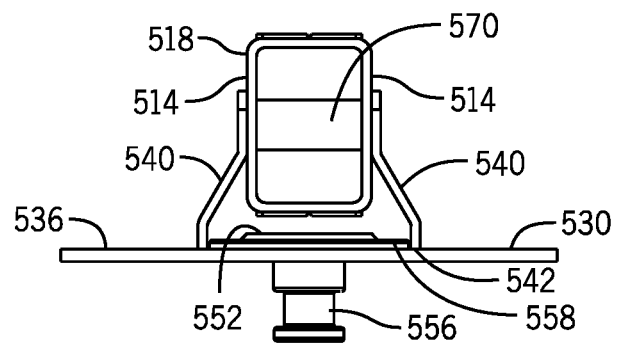
FIG. 23 is a rear view of the kingpin connection assembly.
Figure 30:
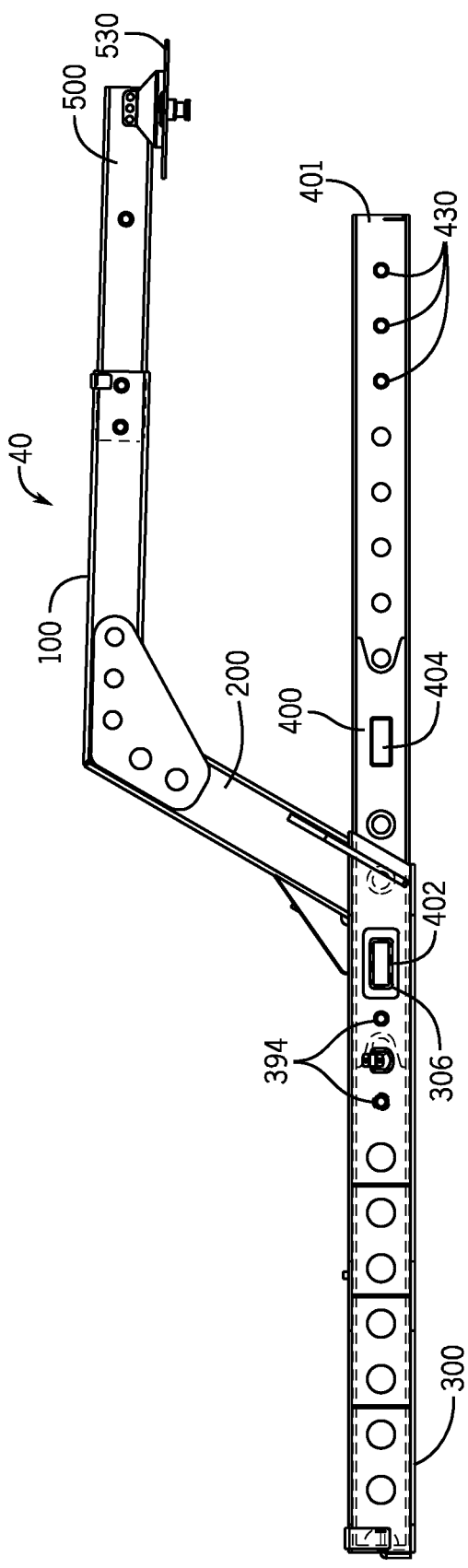
FIG. 30 is a side view of the towing system with the kingpin connection assembly installed and the beam member collapsed.
Figure 31:
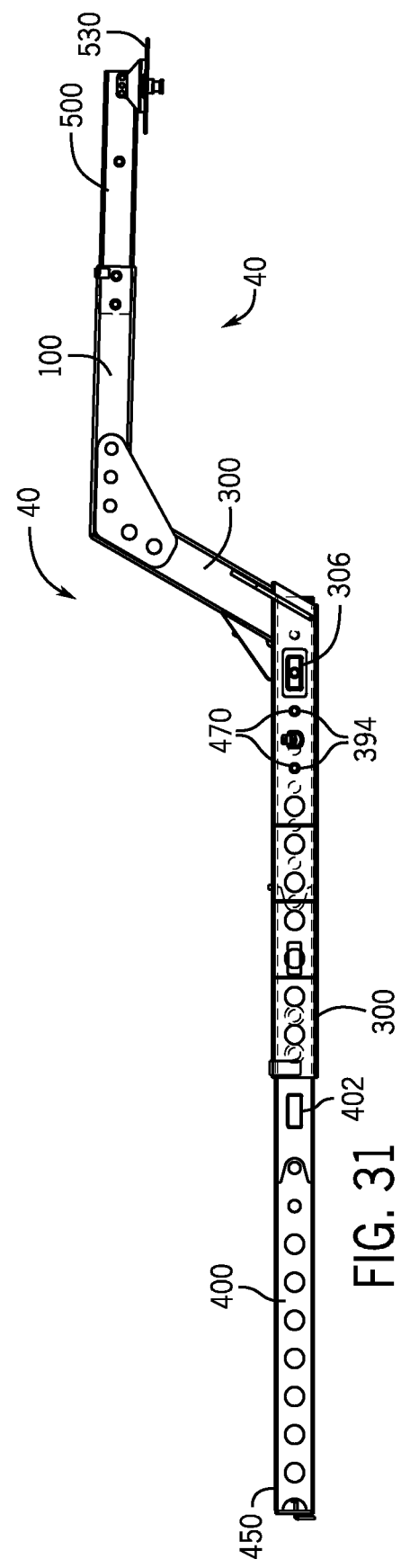
FIG. 31 is a side view of the towing system with the kingpin connection assembly installed and the beam member extended.

With respect to FIG. 17, an upper shim plate 590 is mounted to an upper surface 512 of the tube 510 spaced a distance from a rear end 519 of the rear portion 518 of the tube 510. A lower shim plate 595 is mounted to the lower surface 513 of the tube 510 proximate the rear end 519 of the rear portion 518 of the tube 510. The upper and lower shim plates 590 and 595 take up space in the generally hollow interior 121 of the upper member 100 to make a tighter fit between the tube 510 and the generally hollow interior 121 of the front portion 118 of the upper member 100.

The tube 510 may also include a more sets of openings 129 passing through the lateral sides 514 of the tube 510. These openings 129 are used to lock the tube 510 in place in a collapsed or storage configuration. When the towing system 40 is not in use, for example on a return trip after a delivery, the tube 510 may be withdrawn into the front portion 118 of the upper member 100 past the openings 560 and locked in place by inserting removable fasteners, such as a bolt, pin, rod, lock, etc. through the openings 129. This locks the towing system 40 into the collapsed or storage configuration.

The frame connection assembly 600 will now be described with reference to FIGS. 11-16. The frame connection assembly 600 includes a tube 610. The tube 610 is a generally linear member. A hitch tube 630 is mounted below a lower surface 612 of the tube 610 at a front portion 622 of the tube 610. The saddle mount 15 lockingly engages with the hitch tube 630.

The hitch tube 630 is mounted generally perpendicular to length of the tube 610. An upper surface 632 of the hitch tube 630 may be directly welded or otherwise fastened to the lower surface 612 of the tube 610. In this aspect, mounting gussets 640 are welded to the lower surface 612 of the tube 610 and to a rear surface 634 of the hitch tube 630. The mounting gussets 640 may include a generally triangular shape with a first side 645 welded to the lower surface 612 of the tube 610 and a second side 648 welded to the rear surface 634 of the hitch tube 630, wherein the first side 645 and the second side 648 are adjacent sides of the generally triangular shape.

The tube 610 slides into a generally hollow interior 121 of the front portion 118 of the upper member 100. In this aspect, a rear portion 618 of the tube 610 slides into the generally hollow interior 121 of the front portion 118 of the upper member 100. The rear portion 618 of the tube 610 has an outer diameter less than an inner diameter of the front portion 118 of the upper member 100. The tube 610 may include a larger outer diameter closer to the front portion 622 of the tube 610. The hitch tube 630 incudes a generally square or rectangular outer surface. Hitch rods 641, 642 and 644 and are mounted to the hitch tube 630. In this aspect, a first hitch rod 641 is mounted parallel to the rear surface 634 of the hitch tube 630, a second hitch rod 642 is mounted parallel to the front surface 636 of the hitch tube 630, and a third hitch rod 644 is mounted parallel to the front surface 636 of the hitch tube 630 above the second hitch rod 642.

The rear portion 618 of the tube 610 includes one or more sets of openings 660 passing through the lateral sides 614 of the tube 610. Similarly, the front portion 118 of the upper member 100 includes the one or more sets of openings 128 passing through the lateral sides 126 of the front portion 118. Removable fasteners, such a bolts, pins, rods, etc. pass through the openings 128 and the openings 660 and are fastened in place. In the aspect shown in the FIGS, pin sleeves 670 are aligned with the openings 660. Linch pins 680 pass through the openings 128, the openings 660, and an inner diameter of the pin sleeves 670 to affix the frame connection assembly 600 to the front portion 118 of the upper member 100. The linch pins 680 may receive a cotter pin assembly or other locking device to hold the linch pins 680 in place. The frame connection assembly 600 may be formed from solid, hollow or partially hollow sections of square tubing, round tubing, or stock. If the frame connection assembly 600 is formed from solid carbon steel, then the one or more sets of openings 660 are bored through the width of the tube 610. The frame connection assembly 600 may be made from low to medium strength carbon steel. With respect to FIGS. 11 and 12, an upper shim plate 690 is mounted to an upper surface 632 of the tube 610 spaced a distance from a rear end of the rear portion 618 of the tube 610. A lower shim plate 695 is mounted to the lower surface 612 of the tube 610 proximate the rear end of the rear portion 618 of the tube 610. The upper and lower shim plates 690 and 695 take up space in the generally hollow interior 121 of the upper member 100 to make a tighter fit between the tube 610 and the generally hollow interior 121 of the front portion 118 of the upper member 100

In other aspects, the kingpin connection assembly 500 and the frame connection assembly 600 are removably connected or engaged to an upper member of a towing system having a beam member that is fixedly engaged to a lower member or having a beam member 400 that is integral with the lower member—such that the beam member 400 is stationary relative to the lower member. In other aspects, the kingpin connection assembly 500 and the frame connection assembly 600 are removably connected or engaged to an upper member of a towing system having a lower member that supports the front axle assembly 23 of the second truck and the rear frame 26 of the second truck 20.

In another aspect, as shown in FIGS. 27-31, the beam member 400 includes the first transport opening 402 and the second transport opening 404 that are complementary or matching to the third transport opening 306 in the lower member 300. The transport openings 402, 404, and 306 provide for access entry points for a forklift, skid-steer, or other moving apparatus with a fork or arm members to engage with the towing system 40 in order to lift and move the towing system 40.

As described above, the beam member 400 is withdrawn or retracted through the interior 370 of the lower member 300 and through the front opening 336 such that much of the beam member 400 is directly underneath the upper member 100 and the first transport opening 402. The beam member 400 is withdrawn or retracted sufficiently through the interior 370 of the lower member 300 of the beam member 400 such that the first transport opening 402 is aligned with the third transport opening 306 in the lower member 300. The beam member 400 may be locked in place with the pin 470. In moving the beam member 400 to the collapsed configuration, the beam member 400 is withdrawn or retracted through the interior 370 of the lower member 300 sufficiently such that the first transport opening 402 and the third transport opening 306 are in alignment, while the second transport opening 404 is outside of the lower member 300. Now, the moving apparatus may lift or move the entire towing system 40 in a single operation. A first fork or arm of the moving apparatus may pass through the combination of the first transport opening 402 and the third transport opening 306 while a second fork or arm of the same moving apparatus may pass the second transport opening 404 in order lift or move the towing system 40, which may weigh approximately 1600 pounds. Thus, the first and second forks or arms may generally simultaneously pass through the three transport openings 402, 404, and 306.

The first transport opening 402 and the second transport opening 404 are both in a side of the beam member 400, and a space or distance between the first transport opening 402 and the second transport opening 404 is constant and is determined by the spacing between the forks or arms of the moving apparatus. In other aspects, the relative positions or spacing of the three transport openings 402, 404, and 306 may be adjusted to accommodate different types and styles of moving apparatus. The relative positions or spacing of the three transport openings 402, 404, and 306 may also be adjusted to accommodate different sizes and weights of towing systems 40. The first and second transport openings 402, 404 of the beam member 400 are positioned closer to the front end 401 of the beam member 400.

The first transport opening 402 and the second transport opening 404 pass entirely through a side of the beam member 400. Similarly, the third transport opening 306 passes entirely through a side of the lower member 300. The third transport opening 306 in the lower member 300 is positioned proximate the junction of the lower member 300 and the middle member 200. The third transport opening 306 in the lower member 300 is positioned proximate the front opening 336 in the lower member 300. The three transport openings 402, 404, and 306 may include rectangular shaped openings with reinforcement.

In other aspects, the kingpin connection assembly 500 and the frame connection assembly 600 may be used with other towing assemblies. The use of the kingpin connection assembly 500 and the frame connection assembly 600 are not limited to towing systems 40 with a collapsible beam member 400. For example, the kingpin connection assembly 500 and the frame connection assembly 600 may be used with towing assemblies that have a fixed version of the beam member 400, a one-piece version of the lower member 300 that lacks a beam member 400, a rigid combination of the lower member 300 and the beam member 400, etc.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claims.

The invention claimed is:

1. A truck towing system, comprising:
   an upper member;
   a connection assembly comprising a tube, a front portion of the tube configured to removably engage or connect with a first truck;
   a rear portion of the tube configured to removably engage or connect with the upper member;
   a lower member, wherein the lower member joins the upper member in a fixed engagement;
   the lower member supports a front portion of a second truck;
   a beam member, the beam member engaged to the lower member;
   the beam member configured to connect to a rear portion of the second truck;
   wherein the connection assembly is a kingpin connection assembly, a coupler plate is mounted to a front portion of the tube, and a kingpin is mounted to the coupler plate; and
   wherein a rear portion of the tube is configured to removably slide into a generally hollow interior of a front portion of the upper member.

2. The truck towing system according to claim 1, wherein the tube is linearly shaped.

3. The truck towing system according to claim 1, wherein the connection assembly includes a frame connection assembly and the kingpin connection assembly, and one of the frame connection assembly and the kingpin connection assembly are removably engaged or connected with the upper member.

4. The truck towing system according to claim 1, wherein the connection assembly is configured to be replaced with a different connection assembly.

5. The truck towing system according to claim 1, wherein the rear portion of the tube has an outer diameter less than an inner diameter of the front portion of the upper member.

6. The truck towing system according to claim 1, wherein the kingpin includes a mounting plate portion and a kingpin portion, the kingpin portion passes through a central circular opening of the coupler plate, and the mounting plate portion is welded or otherwise fastened to the coupler plate with the kingpin portion pointing downward.

7. The truck towing system according to claim 1, wherein the rear portion of the tube includes one or more sets of openings passing through lateral sides of the tube, a front portion of the upper member includes one or more sets of openings passing through lateral sides of the front portion, and removable fasteners pass through the openings of the lateral sides of the tube and the openings of the lateral sides of the front portion, and the fasteners hold the rear portion of the tube in the front portion of the upper member.

8. The truck towing system according to claim 1, wherein the beam member slides in and out of an interior of the lower member, the beam member slides to a collapsed configuration, and the beam member slides to an extended configuration.

9. The truck towing system according to claim 1, wherein the truck towing system is adjustable in length by extending or retracting the beam member relative to the lower member, wherein the beam member slides in and out of a rear opening of the lower member.

10. The truck towing system according to claim 1, wherein the beam member includes a first transport opening and a second transport opening, and the lower member includes a third transport opening, and the beam member is withdrawn or retracted such that the first transport opening is aligned with the third transport opening in the lower member.

11. A truck towing system, comprising:
an upper member;
a connection assembly comprising a tube, a front portion of the tube configured to removably engage or connect with a first truck;
a rear portion of the tube configured to removably engage or connect with the upper member;
a lower member, wherein the lower member joins the upper member in a fixed engagement;
the lower member supports a front portion of a second truck;
a beam member, the beam member engaged to the lower member;
the beam member configured to connect to a rear portion of the second truck;
wherein the connection assembly is a kingpin connection assembly, a coupler plate is mounted to a front portion of the tube, and a kingpin is mounted to the coupler plate; and
wherein a rear portion of the tube has an outer diameter less than an inner diameter of a front portion of the upper member.

12. A truck towing system, comprising:
an upper member;
a frame connection assembly configured to removably engage or connect with a first truck;
the frame connection assembly configured to removably engage or connect with the upper member;
a lower member, wherein the lower member joins the upper member in a fixed engagement;
the lower member supports a front portion of a second truck;
a beam member, the beam member engaged to the lower member;
the beam member configured to connect to a rear portion of the second truck;
the frame connection assembly includes a tube, and a hitch tube is mounted to a lower surface of the tube generally perpendicular to the tube; and
wherein mounting gussets are welded to the lower surface of the tube and to a rear surface of the hitch tube, and one or more hitch rods are welded to the lower surface of the tube or to a rear surface of the hitch tube.

13. A truck towing system, comprising:
an upper member;
a connection assembly comprising a tube, a front portion of the tube configured to removably engage or connect with a first truck;
a rear portion of the tube configured to removably engage or connect with the upper member;
a lower member, wherein the lower member joins the upper member in a fixed engagement;
the lower member supports a front portion of a second truck;
a beam member, the beam member engaged to the lower member;
the beam member configured to connect to a rear portion of the second truck;
wherein the connection assembly is a frame connection assembly and a hitch tube is mounted to a lower surface of the tube generally perpendicular to the tube;
wherein the rear portion of the tube has an outer diameter less than an inner diameter of a front portion of the upper member.

14. A truck towing system, comprising:
an upper member;
a connection assembly comprising a tube, a front portion of the tube configured to removably engage or connect with a first truck;
a rear portion of the tube configured to removably engage or connect with the upper member;
a lower member, wherein the lower member joins the upper member in a fixed engagement;
the lower member supports a front portion of a second truck;
a beam member, the beam member engaged to the lower member;
the beam member configured to connect to a rear portion of the second truck;
wherein the connection assembly is a frame connection assembly and a hitch tube is mounted to a lower surface of the tube generally perpendicular to the tube;
wherein the tube of the connection assembly is solid, hollow, or partially hollow;
wherein the rear portion of the tube is configured to removably slide into a generally hollow interior of a front portion of the upper member.

15. The truck towing system according to claim 14, wherein the rear portion of the tube includes one or more sets of openings passing through lateral sides of the tube, the front portion of the upper member includes one or more sets of openings passing through lateral sides of the front portion, and removable fasteners pass through the openings of the lateral sides of the tube and the openings of the lateral sides of the front portion, and the fasteners hold the rear portion of the tube in the front portion of the upper member.

16. A truck towing system for use with a saddle mount or a kingpin mount, comprising:
an upper member;
a connection assembly configured to removably engage or connect with a towing truck having a saddle mount or a kingpin mount, wherein the connection assembly is a frame connection assembly or a kingpin connection assembly;
a rear portion of the connection assembly includes a linear shaped tube that is configured to removably engage or connect with the upper member;
a lower member, wherein the lower member joins the upper member in a fixed engagement;
the lower member configured to support a front portion of a towed truck;
a beam member, the beam member engaged to the lower member;
the beam member configured to connect to a rear portion of the towed truck; and
wherein the tube is configured to removably slide into an interior of a front portion of the upper member.

17. The truck towing system according to claim 16, wherein the beam member includes a first transport opening and a second transport opening, and the lower member includes a third transport opening, and the beam member is withdrawn or retracted such that the first transport opening is aligned with the third transport opening in the lower member.

18. A method of converting a truck towing system for use with a saddle mount or a kingpin mount, comprising:

providing an upper member and a lower member, wherein the lower member joins the upper member in a fixed engagement, the lower member configured to support a front portion of a towed truck;

providing a beam member, the beam member engaged to the lower member, and the beam member configured to connect to a rear portion of the towed truck;

determining whether a towing truck has a saddle mount or a kingpin mount;

providing a frame connection assembly with a first tube and providing a kingpin connection assembly with a second tube;

engaging or connecting the frame connection assembly or the kingpin connection assembly with the upper member, the frame connection assembly configured to removably engage or connect with the saddle mount of the towing truck, and the kingpin connection assembly configured to removably engage or connect with the kingpin mount of the towing truck; and sliding a rear portion of the first tube or the second tube into an interior of a front portion of the upper member.

19. The method according to claim 18, further comprising disengaging or disconnecting the frame connection assembly or the kingpin connection assembly from the upper member.

20. A method of using of a truck towing system comprising:

providing an upper member and a lower member, wherein the lower member joins the upper member in a fixed engagement, the lower member configured to support a front portion of a towed truck;

providing a beam member, the beam member engaged to the lower member, and the beam member configured to connect to a rear portion of the towed truck;

providing a frame connection assembly and a kingpin connection assembly;

selecting the frame connection assembly or the kingpin connection assembly to provide a selected connection assembly, the frame connection assembly configured to engage a saddle mount of a towing truck and the kingpin connection assembly configured to engage a kingpin mount of the towing truck;

engaging the selected connection assembly with the upper member; and inserting a rear portion of the selected connection assembly into an interior of a front portion of the upper member.

21. The method of using of a truck towing system according to claim 20, further comprising fastening the rear portion of the selected connection assembly to the front portion of the upper member.

22. The method of using of a truck towing system according to claim 20, further comprising removing the selected connection assembly from the upper member, and replacing the selected connection assembly with the other of the frame connection assembly or the kingpin connection assembly.

23. The method of using of a truck towing system according to claim 20, further comprising connecting the rear portion of the towed truck to the beam member and connecting the selected connection assembly to the towing truck.

\* \* \* \* \*